US011286379B2

(12) United States Patent
Bellehumeur et al.

(10) Patent No.: US 11,286,379 B2
(45) Date of Patent: Mar. 29, 2022

(54) FLEXIBLE ROTATIONALLY MOLDED ARTICLE

(71) Applicant: NOVA Chemicals (International) S.A., Fribourg (CH)

(72) Inventors: Celine Bellehumeur, Calgary (CA); Maryam Fereydoon, Calgary (CA); Amy Phinney, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 281 days.

(21) Appl. No.: 16/595,585

(22) Filed: Oct. 8, 2019

(65) Prior Publication Data

US 2021/0102050 A1 Apr. 8, 2021

(51) Int. Cl.
| | |
|---|---|
| *C08G 18/75* | (2006.01) |
| *C08L 23/08* | (2006.01) |
| *B29C 41/00* | (2006.01) |
| *B29C 41/04* | (2006.01) |

(52) U.S. Cl.
CPC ........ *C08L 23/0815* (2013.01); *B29C 41/003* (2013.01); *B29C 41/04* (2013.01); *B29K 2023/06* (2013.01); *C08L 2201/08* (2013.01); *C08L 2205/025* (2013.01); *C08L 2205/03* (2013.01); *C08L 2310/00* (2013.01)

(58) Field of Classification Search
CPC ... C08L 23/0815; C08F 2420/04; B29C 41/04
See application file for complete search history.

(56) References Cited

U.S. PATENT DOCUMENTS

| | | | |
|---|---|---|---|
| 4,104,609 A | 8/1978 | Minegishi et al. | |
| 4,379,882 A | 4/1983 | Miyata | |
| 4,731,438 A | 3/1988 | Bernier | |
| 4,803,259 A | 2/1989 | Zboril et al. | |
| 6,180,730 B1 | 1/2001 | Sibtain et al. | |
| 6,277,931 B1 | 8/2001 | Jaber et al. | |
| 6,444,733 B1 | 9/2002 | Stadler | |
| 6,469,103 B1* | 10/2002 | Jain | C08L 23/0815 525/240 |
| 8,907,018 B2* | 12/2014 | Bellehumeur | C08L 23/0815 525/240 |
| 9,512,282 B2 | 12/2016 | Li et al. | |
| 9,695,309 B2 | 7/2017 | Bellehumeur et al. | |
| 10,023,706 B2 | 7/2018 | Bellehumeur et al. | |

(Continued)

FOREIGN PATENT DOCUMENTS

CA 2868640 A1 4/2016

OTHER PUBLICATIONS

Dealy, John and Plazek, Don; Time-Temperature Superposition—A Users Guide; Rheology Bulletin, Jul. 2009, 78 (2); pp. 16-31.

(Continued)

*Primary Examiner* — Michael M Dollinger
(74) *Attorney, Agent, or Firm* — Thomas J. Styslinger

(57) ABSTRACT

Rotomolded articles, especially flexible rotomolded articles are made from an ethylene interpolymer product having a melt index, $I_2$ of from 2.5 to 8.0 g/10 min, a density of from 0.905 to 0.920 g/cm$^3$; and a Dilution Index, Yd, greater than 0. The ethylene interpolymer product comprises: (I) a first ethylene interpolymer; (II) a second ethylene interpolymer, and; (III) optionally a third ethylene interpolymer.

26 Claims, 7 Drawing Sheets

(56) References Cited

U.S. PATENT DOCUMENTS

| | | |
|---|---|---|
| 10,035,906 B2 | 7/2018 | Li et al. |
| 10,040,928 B2 | 8/2018 | Wang et al. |
| 2018/0298170 A1 | 10/2018 | Fereydoon et al. |

OTHER PUBLICATIONS

Twinkle, Stefan; Walter, Philipp and Freidrich, Christian; Van Gurp-Palmen Plot II—classification of long chain branched polymers by their topology; Rheol Acta (2002) 41; Copyright Springer-Verlag 2002; pp. 103-113.

Wild, L.; Ryle, T.R.; Knobelock, D.C. and Peat, I.R.; Determination of Branching Distributions in Polyethylene and Ethylene Copolymers; Copyright 1982 John Wiley & Songs, Inc. Journal of Polymer Science: Polymer Physics Edition. vol. 20, pp. 441-455.

Wu, Souheng; Chain Structure and Entanglement; Bopyright 1989 John Wiley & Sons, Inc.; Journal of Polymer Science: Part B: Polymer Physics, vol. 27, pp. 723-741.

Cocchini, Maria Rossella Nobile Franco; Evaluation of molecular weight distribution from dynamic moduli; Rheol Acta (2001) 40: Copyright Springer Verlag 2001. pp. 222-119.

Deslauriers, Paul J.; Rohlfing, David C. and Hsieh, Eric T; Quantifying short chain branching microstructures in ethylene 1-olefin copolymers using size exclusion chromatography and Fourier transform infrared spectroscopy (SEC-FTIR); Polymers 43 (2002) pp. 159-170.

Baumgaertel, M. and Winter, H.H.; Determination of discrete relaxation and retardation time spectra from dynamic mechanical data; Rheol Acta 28 (1989); pp. 511-519.

Bird, R. Byron; Armstrong, Robert C. and Hassager, Ole; Dynamics of Polymeric Liquids; vol. 1: Fluid Mechanics; Second Edition, Copyright John Wiley & Sons (1987); pp. 227-233.

Marin, Gerard; Rheological Measurement; Chapter 10, Oscillatory Rheometry; Copyright Springer Science + Budiness Media Dordrecht 1993. pp. 297-343.

Wang, W.Q. and Kontopoulou, M.; Rotational Molding of Polypropylene/Ultra-Low-Density Ethylene-alpha-Olefin Copolymer Blends; Polymer Engineering and Science, Sep. 2004, vol. 44, No. 9. pp. 1662-1669.

ASTM D5628-18; Standard Test Method for Impact Resistance of Flat, Rigid Plastic Speciments by Means of a Falling Dart (Tup or Falling Mass); Copyright ASTM International; Current Edition approved May 1, 2018. Published Jun. 2018. Originally approved in 1994. Last previous edition approved in 2010 as D5628-10. pp. 1-10.

ASTM D2240-15; Standard Test Method for Rubber Property-Durometer Hardness; Copyright ASTM International; Current edition approved Aug. 1, 2015. Published Jan. 2016. Originally approved in 1964. Last previous edition approved in 2010 as D2240-05. pp. 1-13.

ASTM D1525-07; Standard Test Method for Vicat Softening Temperature of Plastics; Copyright ASTM International; Current edition approved Mar. 1, 2007. Published Mar. 2007. Originally approved in 1958. Last previous edition approved in 2006 as D1525-06. pp. 1-9.

ASTM D790-10; Standard Test Methods for Flexural Properties of Unreinforced and REinforced Plastics and Electrical Insulating Materials; Copyright ASTM International; Current Edition approved Apr. 1, 2010. Published Apr. 2010. Originally approved in 1970. Last previous edition approved in 2007 as D790-07. pp. 1-11.

ASTM D638-14; Standard Test Method for Tensile Properties of Plastics; Copyright ASTM International; Current edition approved Dec. 14, 2014. Published Mar. 2015. Originally approved in 1941. Last previous edition approved in 2010 as D638-10. pp. 1-17.

ASTM D6645-01 (Reapproved 2010); Standard Test Method for Methyl (Comonomer) Content in Polyethylene by Infrared Spectrophotometry; Copyright ASTM International; Current edition approved Jan. 1, 2010. Published Jan. 2010. Originally approved in 2001. Last previous edition approved in 2001 as D6645-01. pp. 1-4.

ASTM D4703-16; Standard Practice for Compression Molding Thermoplastic Materials Into Test Specimens, Plaques, or Sheets; Copyright ASTM International; Current edition approved Apr. 1, 2016. Published Apr. 2016. Originally approved in 1991. Last previous edition approved in 2010 as D4703-10a. pp. 1-13.

ASTM D3124-98 (Reapproved 2011); Standard Test Method for Vinylidene Unsaturation in Polyethylene by Infrared Spectrophotometry; Copyright ASTM International; Current edition approved Feb. 1, 2011. Published Mar. 2011. Originally approved in 1972. Last previous edition approved in 2003 as D3124-98 (2003). pp. 1-4.

ASTM D 1238-04; Standard Test Method for Melt Flow Rates of Thermoplastics by Extrusion Plastometer; Copyright ASTM International; Current edition approved Mar. 1, 2004. Published Apr. 2004. Originally approved in 1965. Last previous edition approved in 2001 as D1238-01. pp. 1-13.

ASTM D792-13; Standard Test Methods for Density and Specific Gravity (Relative Density) of Plastics by Displacement; Copyright ASTM International; Current edition approved Nov. 1, 2013. Published Nov. 2013. Originally approved in 1944. Last previous edition approved in 2008 as D792-08. pp. 1-6.

ASTM D6474-99 (Reapproved 2006); Standard Test Method for Determining Molecular Weight Distribution and Molecular Weight Averages of Polyolefins by High Temperature Gel Permeation Chromatography; Copyright ASTM International; Current edition approved Mar. 15, 2006. Published Apr. 2006. Originally approved in 1999. Last previous edition approved in 1999 as D6474-99. pp. 1-6.

ASTM D6474-12; Standard Test Method for Determining Molecular Weight Distribution and Molecular Weight Averages of Polyolefins by High Temperature Gel Permeation Chromatography; Copyright ASTM International; Current edition approved Dec. 15, 2012. Published Dec. 2012. Originally approved in 1999. Last previous edition approved in 2006 as D6474-99 (2006). pp. 1-6.

ASTM D6248-98 (Reapproved 2012); Standard Test Method for Vinyl and TransUnsaturation in Polyethylene by Infrared Spectrophotometry; Copyright ASTM International; Current edition approved May 1, 2012. Originally approved in 1998. Last previous edition approved in 2004 as D6248-98 (2004). pp. 1-3.

\* cited by examiner

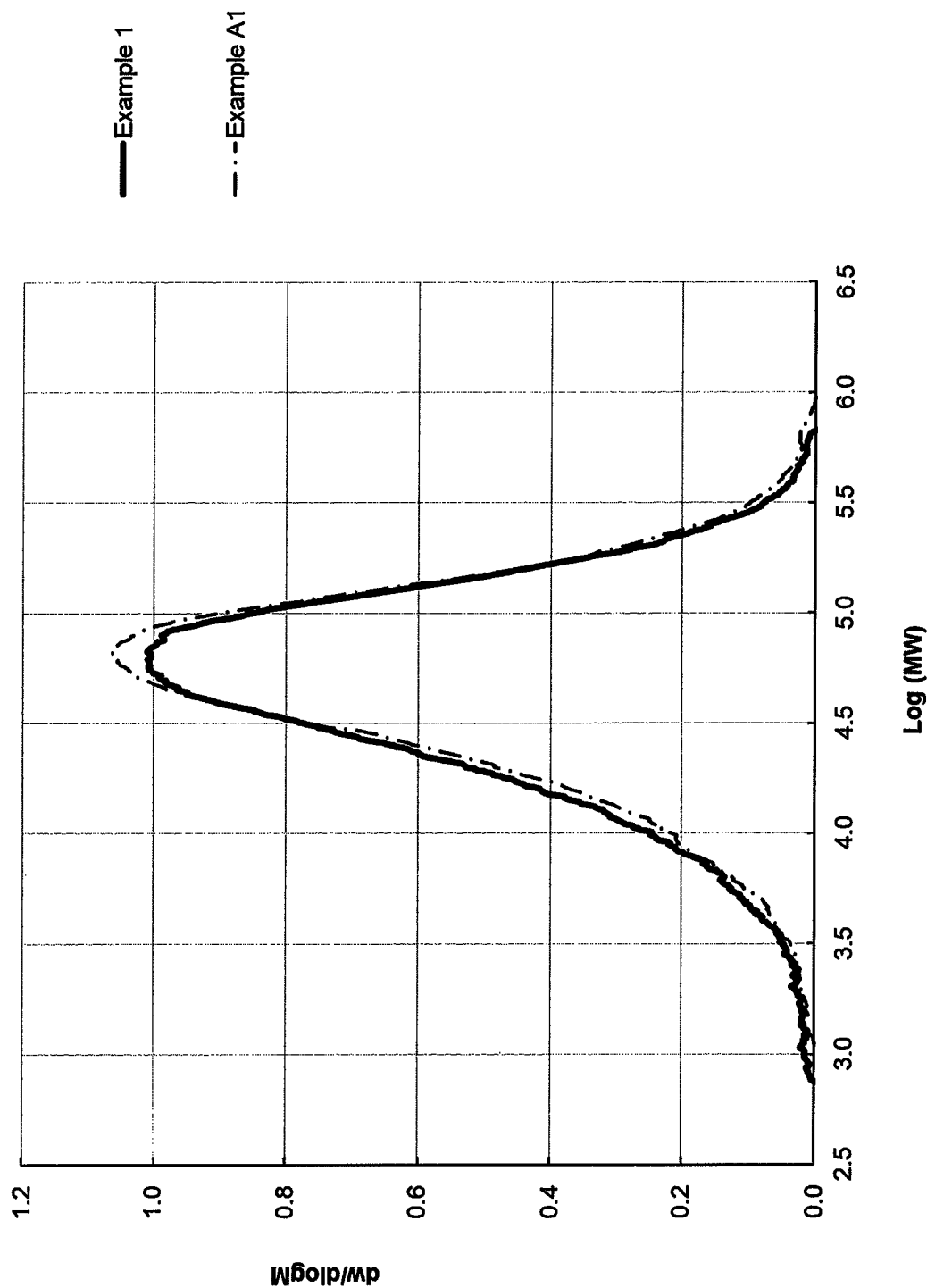

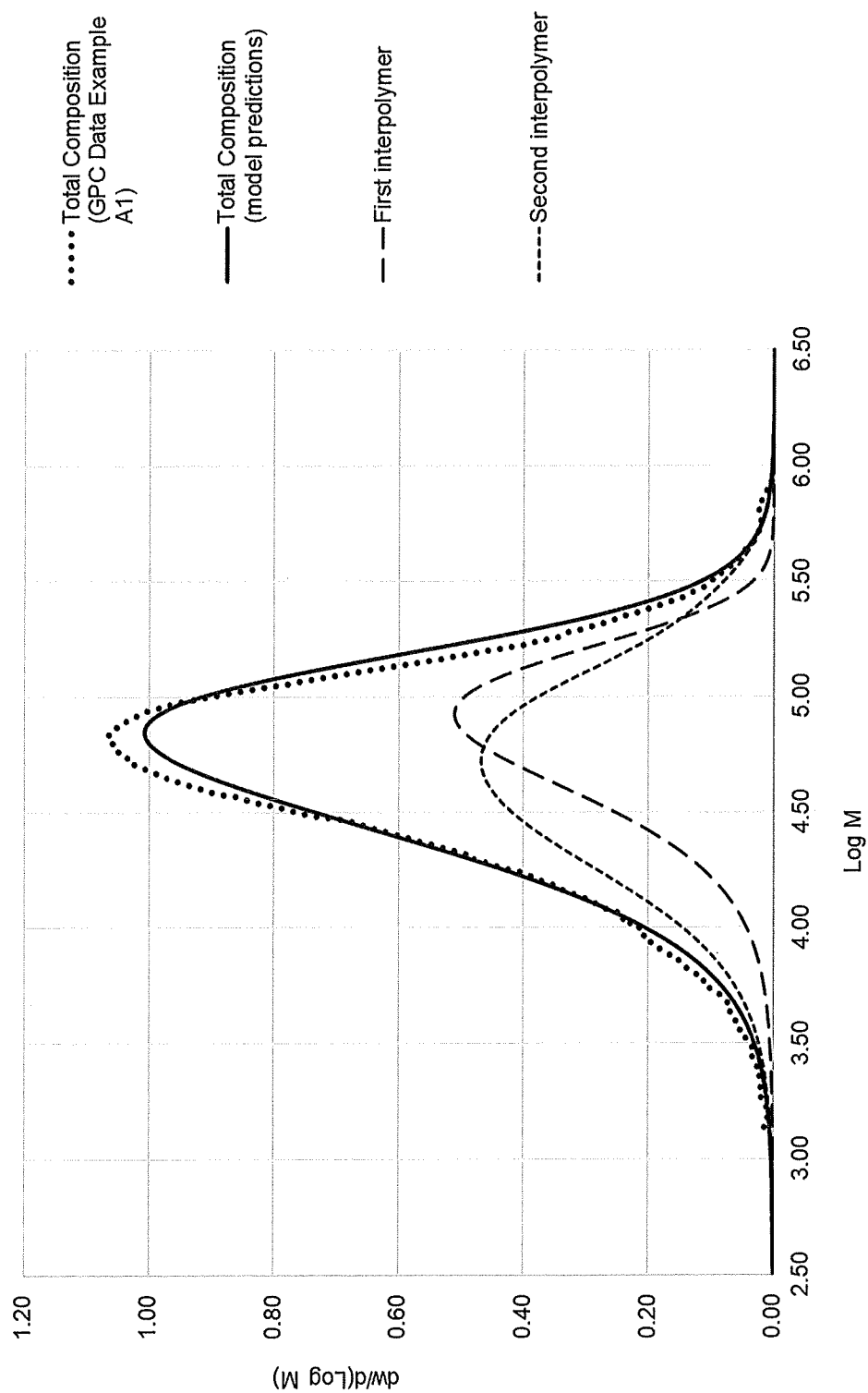

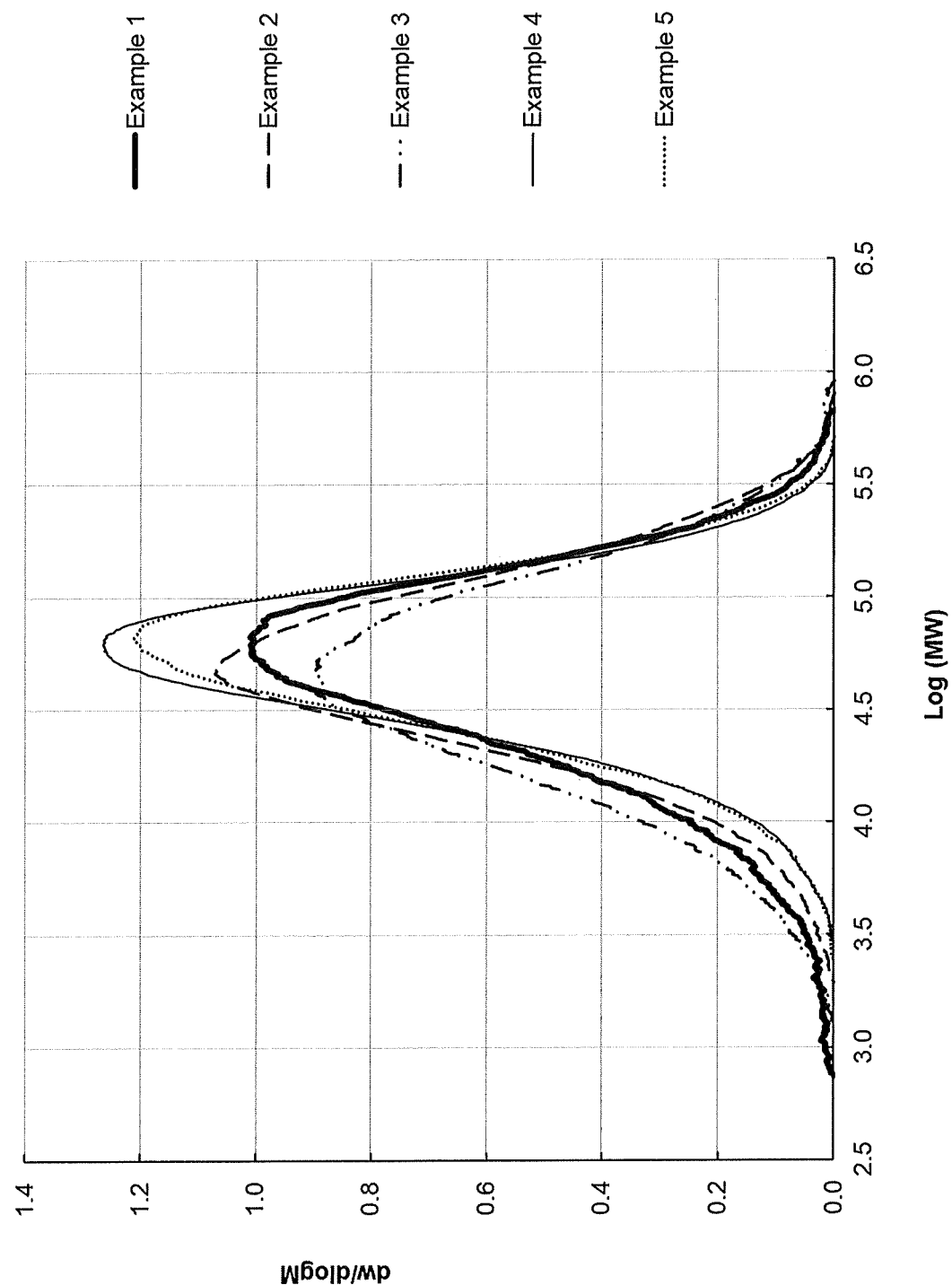

FLEXIBLE ROTATIONALLY MOLDED ARTICLE

In some embodiments, this disclosure relates the use of ethylene interpolymer products having a melt index of from 2.5 to 8.0 g/10 minutes, a density of from 0.905 to 0.920 g/cm³ and a Dilution Index, Yd, of greater than 0 degrees to prepare flexible rotationally molded articles.

The preparation of ethylene interpolymer products having a dilution index, Yd, of greater than 0 degrees is disclosed in U.S. Pat. Nos. 10,035,906 and 9,512,282.

The preparation of rotomolded articles from medium density ethylene interpolymer products having a dilution index, Yd, of greater than 0 degrees is disclosed in U.S. Pat. Nos. 10,023,706 and 10,040,928.

U.S. Pat. Pub. No. 2018/0298170 claims ethylene interpolymer products having a density of from 0.910 to 0.912 g/cm³ and a dilution index, Yd, of greater than 0 degrees.

We now report the preparation of flexible rotationally molded articles from low density ethylene interpolymer products having a dilution index, Yd, of greater than 0 degrees.

The low density ethylene interpolymer products having a dilution index, Yd, of greater than 0 degrees can be used to make rotomolded articles that are flexible, with a "soft touch" or "soft touch feel".

An embodiment of the disclosure is a rotomolded article prepared from an ethylene interpolymer product having a melt index, I² of from 2.5 to 8.0 g/10 min, and a density of from 0.905 to 0.920 g/cm³; wherein said ethylene interpolymer product includes:

(I) a first ethylene interpolymer;
(II) a second ethylene interpolymer, and;
(III) optionally a third ethylene interpolymer;
wherein said first ethylene interpolymer is produced using a single site catalyst formulation including a component (i) defined by the formula

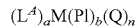

$(L^A)_a M(Pl)_b (Q)_n$ wherein $L^A$ is chosen from unsubstituted cyclopentadienyl, substituted cyclopentadienyl, unsubstituted indenyl, substituted indenyl, unsubstituted fluorenyl and substituted fluorenyl; M is a metal chosen from titanium, hafnium and zirconium; Pl is a phosphinimine ligand; and Q is independently chosen from a hydrogen atom, a halogen atom, a $C_{1-10}$ hydrocarbyl radical, a $C_{1-10}$ alkoxy radical and a $C_{5-10}$ aryl oxide radical; wherein each of said hydrocarbyl, alkoxy, and aryl oxide radicals may be unsubstituted or further substituted by a halogen atom, a $C_{1-18}$ alkyl radical, a $C_{1-8}$ alkoxy radical, a $C_{6-10}$ aryl or aryloxy radical, an amido radical which is unsubstituted or substituted by up to two $C_{1-8}$ alkyl radicals or a phosphido radical which is unsubstituted or substituted by up to two $C_{1-8}$ alkyl radicals; wherein a is 1; b is 1; n is 1 or 2; and (a+b+n) is equivalent to the valence of the metal M, and;

wherein said second ethylene interpolymer is produced using a first Ziegler-Natta catalyst formulation;

wherein said third ethylene interpolymer, when present, is produced using said first Ziegler-Natta catalyst formulation or a second Ziegler-Natta catalyst formulation, and;

wherein said ethylene interpolymer product has a Dilution Index, Yd, greater than 0.

An embodiment of the disclosure is a flexible or "soft touch feel" rotomolded article prepared from an ethylene interpolymer product having a melt index, I₂ of from 2.5 to 8.0 g/10 min, and a density of from 0.905 to 0.920 g/cm³; wherein said ethylene interpolymer product includes:

(I) a first ethylene interpolymer;
(II) a second ethylene interpolymer, and;
(III) optionally a third ethylene interpolymer;
wherein said first ethylene interpolymer is produced using a single site catalyst formulation including a component (i) defined by the formula

$(L^A)_a M(Pl)_b (Q)_n$ wherein $L^A$ is chosen from unsubstituted cyclopentadienyl, substituted cyclopentadienyl, unsubstituted indenyl, substituted indenyl, unsubstituted fluorenyl and substituted fluorenyl; M is a metal chosen from titanium, hafnium and zirconium; Pl is a phosphinimine ligand; and Q is independently chosen from a hydrogen atom, a halogen atom, a $C_{1-10}$ hydrocarbyl radical, a $C_{1-10}$ alkoxy radical and a $C_{5-10}$ aryl oxide radical; wherein each of said hydrocarbyl, alkoxy, and aryl oxide radicals may be unsubstituted or further substituted by a halogen atom, a $C_{1-18}$ alkyl radical, a $C_{1-8}$ alkoxy radical, a $C_{6-10}$ aryl or aryloxy radical, an amido radical which is unsubstituted or substituted by up to two $C_{1-8}$ alkyl radicals or a phosphido radical which is unsubstituted or substituted by up to two $C_{1-8}$ alkyl radicals; wherein a is 1; b is 1; n is 1 or 2; and (a+b+n) is equivalent to the valence of the metal M, and;

wherein said second ethylene interpolymer is produced using a first Ziegler-Natta catalyst formulation;

wherein said third ethylene interpolymer, when present, is produced using said first Ziegler-Natta catalyst formulation or a second Ziegler-Natta catalyst formulation, and;

wherein said ethylene interpolymer product has a Dilution Index, Yd, greater than 0.

An embodiment of the disclosure is rotomolded article prepared from an ethylene interpolymer product having a melt index of from about 2.5 to 8.0 dg/minute, wherein melt index is measured according to ASTM D 1238 (2.16 kg load and 190° C.) and a density of from 0.905 to 0.920 g/cm³, wherein density is measured according to ASTM D792; wherein said ethylene interpolymer product includes:

(I) a first ethylene interpolymer;
(II) a second ethylene interpolymer, and;
(III) optionally a third ethylene interpolymer;
wherein said first ethylene interpolymer is produced using a single site catalyst formulation including a component (i) defined by the formula

$(L^A)_a M(Pl)_b (Q)n$ wherein $L^A$ is chosen from unsubstituted cyclopentadienyl, substituted cyclopentadienyl, unsubstituted indenyl, substituted indenyl, unsubstituted fluorenyl and substituted fluorenyl; M is a metal chosen from titanium, hafnium and zirconium; Pl is a phosphinimine ligand; Q is independently chosen from a hydrogen atom, a halogen atom, a $C_{1-10}$ hydrocarbyl radical, a $C_{1-10}$ alkoxy radical and a $C_{5-10}$ aryl oxide radical; wherein each of said hydrocarbyl, alkoxy, and aryl oxide radicals may be unsubstituted or further substituted by a halogen atom, a $C_{1-18}$ alkyl radical, a $C_{1-8}$ alkoxy radical, a $C_{6-10}$ aryl or aryloxy radical, an amido radical which is unsubstituted or substituted by up to two $C_{1-8}$ alkyl radicals or a phosphido radical which is unsubstituted or substituted by up to two $C_{1-8}$ alkyl radicals; wherein a is 1; b is 1; n is 1 or 2; and (a+b+n) is equivalent to the valence of the metal M;

wherein said second ethylene interpolymer is produced using a first in-line Ziegler-Natta catalyst formulation;

wherein said third ethylene interpolymer, when present, is produced using said first in-line Ziegler-Natta catalyst formulation or a second in-line Ziegler-Natta catalyst formulation; and, wherein said ethylene interpolymer product has a Dilution Index, Yd, greater than 0.

An embodiment of the disclosure is a flexible or "soft touch feel" rotomolded article prepared from an ethylene interpolymer product having a melt index of from about 2.5 to 8.0 dg/minute, wherein melt index is measured according to ASTM D 1238 (2.16 kg load and 190° C.) and a density of from 0.905 to 0.920 g/cm³, wherein density is measured according to ASTM D792; wherein said ethylene interpolymer product includes:

(I) a first ethylene interpolymer;
(II) a second ethylene interpolymer, and;
(III) optionally a third ethylene interpolymer;
wherein said first ethylene interpolymer is produced using a single site catalyst formulation including a component (i) defined by the formula

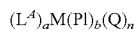

$(L^A)_a M(Pl)_b (Q)_n$ wherein $L^A$ is chosen from unsubstituted cyclopentadienyl, substituted cyclopentadienyl, unsubstituted indenyl, substituted indenyl, unsubstituted fluorenyl and substituted fluorenyl; M is a metal chosen from titanium, hafnium and zirconium; Pl is a phosphinimine ligand; Q is independently chosen from a hydrogen atom, a halogen atom, a $C_{1-10}$ hydrocarbyl radical, a $C_{1-10}$ alkoxy radical and a $C_{5-10}$ aryl oxide radical; wherein each of said hydrocarbyl, alkoxy, and aryl oxide radicals may be unsubstituted or further substituted by a halogen atom, a $C_{1-18}$ alkyl radical, a $C_{1-8}$ alkoxy radical, a $C_{6-10}$ aryl or aryloxy radical, an amido radical which is unsubstituted or substituted by up to two $C_{1-8}$ alkyl radicals or a phosphido radical which is unsubstituted or substituted by up to two $C_{1-8}$ alkyl radicals; wherein a is 1; b is 1; n is 1 or 2; and (a+b+n) is equivalent to the valence of the metal M;

wherein said second ethylene interpolymer is produced using a first in-line Ziegler-Natta catalyst formulation;

wherein said third ethylene interpolymer, when present, is produced using said first in-line Ziegler-Natta catalyst formulation or a second in-line Ziegler-Natta catalyst formulation; and, wherein said ethylene interpolymer product has a Dilution Index, Yd, greater than 0.

An embodiment of the disclosure is a process for forming a rotomolded article, the process including:

(a) preparing an ethylene interpolymer product having a melt index, $I_2$ of from 2.5 to 8.0 g/10 min, and a density of from 0.905 to 0.920 g/cm³; wherein said ethylene interpolymer product includes:

(I) a first ethylene interpolymer;
(II) a second ethylene interpolymer, and;
(III) optionally a third ethylene interpolymer;
wherein said first ethylene interpolymer is produced using a single site catalyst formulation including a component (i) defined by the formula

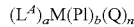

$(L^A)_a M(Pl)_b (Q)_n$ wherein $L^A$ is chosen from unsubstituted cyclopentadienyl, substituted cyclopentadienyl, unsubstituted indenyl, substituted indenyl, unsubstituted fluorenyl and substituted fluorenyl; M is a metal chosen from titanium, hafnium and zirconium; Pl is a phosphinimine ligand; and Q is independently chosen from a hydrogen atom, a halogen atom, a $C_{1-10}$ hydrocarbyl radical, a $C_{1-10}$ alkoxy radical and a $C_{5-10}$ aryl oxide radical; wherein each of said hydrocarbyl, alkoxy, and aryl oxide radicals may be unsubstituted or further substituted by a halogen atom, a $C_{1-18}$ alkyl radical, a $C_{1-8}$ alkoxy radical, a $C_{6-10}$ aryl or aryloxy radical, an amido radical which is unsubstituted or substituted by up to two $C_{1-8}$ alkyl radicals or a phosphido radical which is unsubstituted or substituted by up to two $C_{1-8}$ alkyl radicals; wherein a is 1; b is 1; n is 1 or 2; and (a+b+n) is equivalent to the valence of the metal M;

wherein said second ethylene interpolymer is produced using a first Ziegler-Natta catalyst formulation;

wherein said third ethylene interpolymer, when present, is produced using said first Ziegler-Natta catalyst formulation or a second Ziegler-Natta catalyst formulation; and, wherein said ethylene interpolymer product has a Dilution Index, Yd, greater than 0; and (b) rotomolding the ethylene interpolymer product to form a rotomolded article.

An embodiment of the disclosure is a rotomolded article prepared from an ethylene interpolymer product having a melt index, $I_2$ of from 2.5 to 8.0 g/10 min, and a density of from 0.905 to 0.920 g/cm³; wherein said ethylene interpolymer product includes:

(I) a first ethylene interpolymer;
(II) a second ethylene interpolymer, and;
(III) optionally a third ethylene interpolymer;
wherein said ethylene interpolymer product has a Dilution Index, Yd, of from 4.5 to 6.5.

An embodiment of the disclosure is a flexible or "soft touch feel" rotomolded article prepared from an ethylene interpolymer product having a melt index, $I_2$ of from 2.5 to 8.0 g/10 min, and a density of from 0.905 to 0.920 g/cm³; wherein said ethylene interpolymer product includes:

(I) a first ethylene interpolymer;
(II) a second ethylene interpolymer, and;
(III) optionally a third ethylene interpolymer;
wherein said ethylene interpolymer product has a Dilution Index, Yd, of from 4.5 to 6.5.

BRIEF DESCRIPTION OF THE FIGURES

FIG. 1A shows the gel permeation chromatograph (GPC) with refractive index detection of ethylene interpolymer products made according to the present disclosure.

FIG. 1B shows the deconvolution of Example A1. The experimentally measured GPC chromatogram was deconvoluted into a first and a second ethylene interpolymer.

FIG. 2 shows the gel permeation chromatograph (GPC) with refractive index detection of an ethylene interpolymer product made according to the present disclosure as well as for various comparative resins.

DETAILED DESCRIPTION

Definition of Terms

Figure 3:
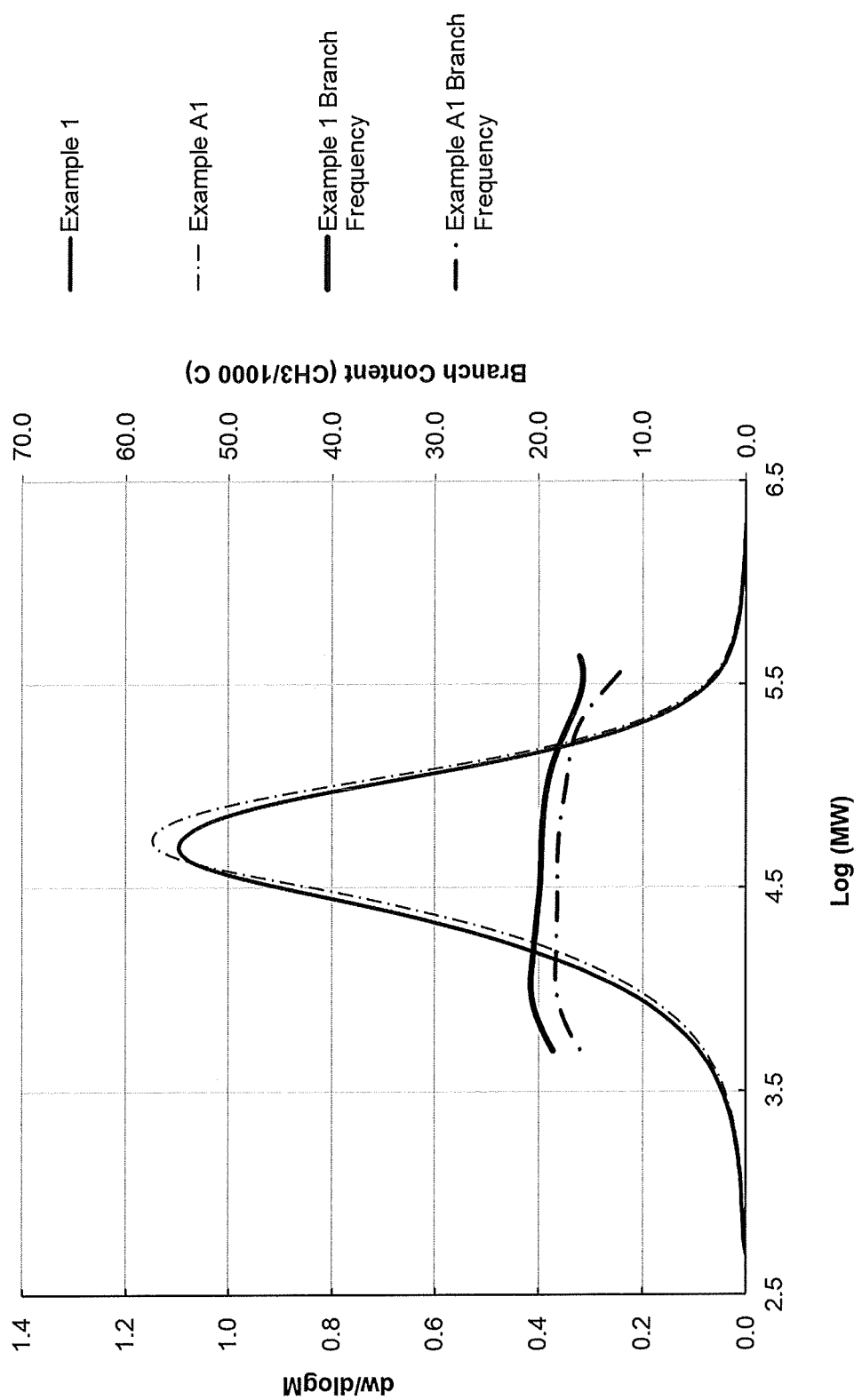
FIG. 3 shows the gel permeation chromatograph with Fourier transform infra-red (GPC-FTIR) detection obtained for ethylene interpolymer products made according to the present disclosure. The comonomer content, shown as the number of short chain branches per 1000 backbone carbons (y-axis), is given relative to the copolymer molecular weight (x-axis). The relatively flat line (from left to right) is the short chain branching (in short chain branches per 1000 carbons atoms) determined by FTIR. As can be seen in FIG. 3, for Examples A1 and 1, the number of short chain branches is relatively constant with molecular weight, and hence the comonomer incorporation is said to be "flat" or "uniform".

Other than in the examples or where otherwise indicated, all numbers or expressions referring to quantities of ingredients, extrusion conditions, etc., used in the specification and claims are to be understood as modified in all instances by the term "about." Accordingly, unless indicated to the contrary, the numerical parameters set forth in the following specification and attached claims are approximations that can vary depending upon the desired properties that the various embodiments desire to obtain. At the very least, and not as an attempt to limit the application of the doctrine of equivalents to the scope of the claims, each numerical parameter should at least be construed in light of the number of reported significant digits and by applying ordinary rounding techniques. The numerical values set forth in the specific examples are reported as precisely as possible. Any numerical values, however, inherently contain certain errors necessarily resulting from the standard deviation found in their respective testing measurements.

It should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, that the amounts of the components actually used will conform to the maximum of 100 percent.

In order to form a more complete understanding of this disclosure the following terms are defined and should be used with the accompanying figures and the description of the various embodiments throughout.

The term "Dilution Index ($Y_d$)", which has dimensions of degrees)(°), and the "Dimensionless Modulus ($X_d$)" are based on rheological measurements and are fully described in this disclosure.

As used herein, the term "monomer" refers to a small molecule that may chemically react and become chemically bonded with itself or other monomers to form a polymer.

As used herein, the term "α-olefin" is used to describe a monomer having a linear hydrocarbon chain containing from 3 to 20 carbon atoms having a double bond at one end of the chain.

As used herein, the term "ethylene polymer", refers to macromolecules produced from ethylene monomers and optionally one or more additional monomers; regardless of the specific catalyst or specific process used to make the ethylene polymer. In the polyethylene art, the one or more additional monomers are called "comonomer(s)" and often include α-olefins. The term "homopolymer" refers to a polymer that contains only one type of monomer. Common ethylene polymers include high density polyethylene (HDPE), medium density polyethylene (MDPE), linear low density polyethylene (LLDPE), very low density polyethylene (VLDPE), ultralow density polyethylene (ULDPE), plastomer and elastomers. The term ethylene polymer also includes polymers produced in a high pressure polymerization processes; non-limiting examples include low density polyethylene (LDPE), ethylene vinyl acetate copolymers (EVA), ethylene alkyl acrylate copolymers, ethylene acrylic acid copolymers and metal salts of ethylene acrylic acid (commonly referred to as ionomers). The term ethylene polymer also includes block copolymers which may include 2 to 4 comonomers. The term ethylene polymer also includes combinations of, or blends of, the ethylene polymers described above.

The term "ethylene interpolymer" refers to a subset of polymers within the "ethylene polymer" group that excludes polymers produced in high pressure polymerization processes; non-limiting examples of polymers produced in high pressure processes include LDPE and EVA (the latter is a copolymer of ethylene and vinyl acetate).

The term "heterogeneous ethylene interpolymers" refers to a subset of polymers in the ethylene interpolymer group that are produced using a heterogeneous catalyst formulation; non-limiting examples of which include Ziegler-Natta or chromium catalysts.

The term "homogeneous ethylene interpolymer" refers to a subset of polymers in the ethylene interpolymer group that are produced using metallocene or single-site catalysts. Typically, homogeneous ethylene interpolymers have narrow molecular weight distributions, for example gel permeation chromatography (GPC) $M_w/M_n$ values of less than 2.8; $M_w$ and $M_n$ refer to weight and number average molecular weights, respectively. In contrast, the $M_w/M_n$ of heterogeneous ethylene interpolymers are typically greater than the $M_w/M_n$ of homogeneous ethylene interpolymers. In general, homogeneous ethylene interpolymers also have a narrow comonomer distribution, i.e. each macromolecule within the molecular weight distribution has a similar comonomer content. Frequently, the composition distribution breadth index "CDBI" is used to quantify how the comonomer is distributed within an ethylene interpolymer, as well as to differentiate ethylene interpolymers produced with different catalysts or processes. The "$CDBI_{50}$" is defined as the percent of ethylene interpolymer whose composition is within 50% of the median comonomer composition; this definition is consistent with that described in U.S. Pat. No. 5,206,075 assigned to Exxon Chemical Patents Inc. The $CDBI_{50}$ of an ethylene interpolymer can be calculated from TREF curves (Temperature Rising Elution Fractionation); the TREF method is described in Wild, et al., J. Polym. Sci., Part B, Polym. Phys., Vol. 20 (3), pages 441-455. Typically the CDBI$_{50}$ of homogeneous ethylene interpolymers are greater than about 70%. In contrast, the CDBI$_{50}$ of α-olefin containing heterogeneous ethylene interpolymers are generally lower than the CDBI$_{50}$ of homogeneous ethylene interpolymers.

It is well known to those skilled in the art, that homogeneous ethylene interpolymers are frequently further subdivided into "linear homogeneous ethylene interpolymers" and "substantially linear homogeneous ethylene interpolymers". These two subgroups differ in the amount of long chain branching: more specifically, linear homogeneous ethylene interpolymers have less than about 0.01 long chain branches per 1000 carbon atoms; while substantially linear ethylene interpolymers have greater than about 0.01 to about 3.0 long chain branches per 1000 carbon atoms. A long chain branch is macromolecular in nature, i.e. similar in length to the macromolecule that the long chain branch is attached to. Hereafter, in this disclosure, the term "homogeneous ethylene interpolymer" refers to both linear homogeneous ethylene interpolymers and substantially linear homogeneous ethylene interpolymers.

Herein, the term "polyolefin" includes ethylene polymers and propylene polymers; non-limiting examples of propylene polymers include isotactic, syndiotactic and atactic propylene homopolymers, random propylene copolymers containing at least one comonomer and impact polypropylene copolymers or heterophasic polypropylene copolymers.

The term "thermoplastic" refers to a polymer that becomes liquid when heated, will flow under pressure and solidify when cooled. Thermoplastic polymers include ethylene polymers as well as other polymers commonly used in the plastic industry; non-limiting examples of other polymers commonly used in film applications include barrier resins (EVOH), tie resins, polyethylene terephthalate (PET), polyamides and the like.

As used herein, the terms "hydrocarbyl", "hydrocarbyl radical" or "hydrocarbyl group" refers to linear or cyclic, aliphatic, olefinic, acetylenic and aryl (aromatic) radicals including hydrogen and carbon that are deficient by one hydrogen.

As used herein, an "alkyl radical" includes linear, branched and cyclic paraffin radicals that are deficient by one hydrogen radical; non-limiting examples include methyl (—CH$_3$) and ethyl (—CH$_2$CH$_3$) radicals. The term "alkenyl radical" refers to linear, branched and cyclic hydrocarbons containing at least one carbon-carbon double bond that is deficient by one hydrogen radical.

Herein the term "R1" and its superscript form "$^{R1}$" refers to a first reactor in a continuous solution polymerization process; it being understood that R1 is distinctly different from the symbol R$^1$; the latter is used in chemical formula, e.g. representing a hydrocarbyl group. Similarly, the term "R2" and its superscript form "$^{R2}$" refers to a second reactor, and; the term "R3" and its superscript form "$^{R3}$" refers to a third reactor.

As used herein the term "unsubstituted" means that hydrogen radicals are bounded to the molecular group that follows the term unsubstituted. The term "substituted" means that the group following this term possesses one or more moieties (non hydrogen radicals) that have replaced one or more hydrogen radicals in any position within the group; non-limiting examples of moieties include halogen radicals (F, Cl, Br), hydroxyl groups, carbonyl groups, carboxyl groups, silyl groups, amine groups, phosphine groups, alkoxy groups, phenyl groups, naphthyl groups, C$_1$ to C$_{30}$ alkyl groups, C$_2$ to C$_{30}$ alkenyl groups, and combinations thereof. Non-limiting examples of substituted alkyls and aryls include: acyl radicals, alkyl silyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals and combinations thereof.

Catalysts

Organometallic catalyst formulations that are efficient in polymerizing olefins are well known in the art. In embodiments disclosed herein, at least two catalyst formulations are employed in a continuous solution polymerization process. One of the catalyst formulations is a single-site catalyst formulation that produces a first ethylene interpolymer. The other catalyst formulation is a heterogeneous catalyst formulation that produces a second ethylene interpolymer. Optionally a third ethylene interpolymer is produced using the heterogeneous catalyst formulation that was used to produce the second ethylene interpolymer, or a different heterogeneous catalyst formulation may be used to produce the third ethylene interpolymer. In the continuous solution process, the first ethylene interpolymer (i.e. at least one homogeneous ethylene interpolymer), the second ethylene interpolymer (i.e. at least one heterogeneous ethylene interpolymer), and optionally a third ethylene interpolymer (i.e. an optional heterogeneous ethylene interpolymer) are solution blended and an ethylene interpolymer product is produced.

Single Site Catalyst Formulation

The catalyst components which make up the single site catalyst formulation are not particularly limited, i.e. a wide variety of catalyst components can be used. One non-limiting embodiment of a single site catalyst formulation includes the following three or four components: a bulky ligand-metal complex; an alumoxane co-catalyst; an ionic activator and optionally a hindered phenol. In Table 1 of this disclosure: "(i)" refers to the amount of "component (i)", i.e. the bulky ligand-metal complex added to R1; "(ii)" refers to "component (ii)", i.e. the alumoxane co-catalyst; "(iii)" refers to "component (iii)" i.e. the ionic activator, and; "(iv)" refers to "component (iv)", i.e. the optional hindered phenol.

Non-limiting examples of component (i) are represented by formula (I):

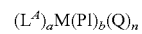

$$(L^A)_a M(Pl)_b (Q)_n \qquad (I)$$

wherein (L$^A$) represents a bulky ligand; M represents a metal atom; Pl represents a phosphinimine ligand; Q represents a leaving group; a is 0 or 1; b is 1 or 2; (a+b)=2; n is 1 or 2, and; the sum of (a+b+n) equals the valance of the metal M.

In an embodiment of the disclosure, L$^A$ is chosen from unsubstituted cyclopentadienyl, substituted cyclopentadienyl, unsubstituted indenyl, substituted indenyl, unsubstituted fluorenyl and substituted fluorenyl.

In an embodiment of the disclosure, M is a metal chosen from titanium, hafnium and zirconium In further non-limiting embodiments of the disclosure, the bulky ligand L$^A$ in formula (I) includes unsubstituted or substituted cyclopentadienyl ligands or cyclopentadienyl-type ligands, heteroatom substituted and/or heteroatom containing cyclopentadienyl-type ligands. In additional non-limiting embodiments, the bulky ligand L$^A$ in formula (I) includes cyclopentaphenanthreneyl ligands, unsubstituted or substituted indenyl ligands, benzindenyl ligands, unsubstituted or substituted fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine, pyrrolyl ligands, pyrozolyl ligands, carbazolyl ligands, borabenzene ligands and the like, including hydrogenated versions thereof, for example tetrahydroindenyl ligands. In other embodiments, $L^A$ may be any other ligand structure capable of q-bonding to the metal M, such embodiments include both $\eta^3$-bonding and $\eta^5$-bonding to the metal M. In other embodiments, $L^A$ may include one or more heteroatoms, for example, nitrogen, silicon, boron, germanium, sulfur and phosphorous, in combination with carbon atoms to form an open, acyclic, or a fused ring, or ring system, for example, a heterocyclopentadienyl ancillary ligand. Other non-limiting embodiments for $L^A$ include bulky amides, phosphides, alkoxides, aryloxides, imides, carbolides, borollides, porphyrins, phthalocyanines, corrins and other polyazomacrocycles.

Non-limiting examples of metal M in formula (I) include Group 4 metals, titanium, zirconium and hafnium.

In an embodiment of the disclosure, the metal M is titanium, Ti.

The phosphinimine ligand, Pl, is defined by formula (II):

$$(R_p)_3P=N— \qquad (II)$$

wherein the $R^P$ groups are independently selected from: a hydrogen atom; a halogen atom; $C_{1-20}$ hydrocarbyl radicals which are unsubstituted or substituted with one or more halogen atom(s); a $C_{1-8}$ alkoxy radical; a $C_{6-10}$ aryl radical; a $C_{6-10}$ aryloxy radical; an amido radical; a silyl radical of formula —Si$(R^s)_3$, wherein the $R^s$ groups are independently selected from, a hydrogen atom, a $C_{1-8}$ alkyl or alkoxy radical, a $C_{6-10}$ aryl radical, a $C_{6-10}$ aryloxy radical, or a germanyl radical of formula —Ge$(R^G)_3$, wherein the $R^G$ groups are defined as $R^s$ is defined in this paragraph.

The leaving group Q is any ligand that can be abstracted from formula (I) forming a catalyst species capable of polymerizing one or more olefin(s). An equivalent term for Q is an "activatable ligand", i.e. equivalent to the term "leaving group". In some embodiments, Q is a monoanionic labile ligand having a sigma bond to M. Depending on the oxidation state of the metal, the value for n is 1 or 2 such that formula (I) represents a neutral bulky ligand-metal complex. Non-limiting examples of Q ligands include a hydrogen atom, halogens, $C_{1-20}$ hydrocarbyl radicals, $C_{1-20}$ alkoxy radicals, $C_{5-10}$ aryl oxide radicals; these radicals may be linear, branched or cyclic or further substituted by halogen atoms, $C_{1-10}$ alkyl radicals, $C_{1-10}$ alkoxy radicals, $C_{6-10}$ aryl or aryloxy radicals. Further non-limiting examples of Q ligands include weak bases such as amines, phosphines, ethers, carboxylates, dienes, hydrocarbyl radicals having from 1 to 20 carbon atoms. Two Q ligands may also be joined to one another and form for example, a substituted or unsubstituted diene ligand (e.g. 1,3-butadiene); or a delocalized heteroatom containing group such as an acetate or acetamidinate group.

In an embodiment of the disclosure, Q is independently chosen from a hydrogen atom, a halogen atom, a $C_{1-10}$ hydrocarbyl radical, a $C_{1-10}$ alkoxy radical and a $C_{5-10}$ aryl oxide radical; wherein each of said hydrocarbyl, alkoxy, and aryl oxide radicals may be unsubstituted or further substituted by a halogen atom, a $C_{1-18}$ alkyl radical, a $C_{1-8}$ alkoxy radical, a $C_{6-10}$ aryl or aryloxy radical, an amido radical which is unsubstituted or substituted by up to two $C_{1-8}$ alkyl radicals or a phosphido radical which is unsubstituted or substituted by up to two $C_{1-8}$ alkyl radicals In an embodiment of the disclosure, each Q is independently chosen from a halide atom, a $C_{1-4}$ alkyl radical and a benzyl radical. In another embodiment of the disclosure activatable ligands Q are monoanionic such as a halide (e.g. chloride) or a hydrocarbyl (e.g. methyl, benzyl).

The second single site catalyst component, component (ii), is an alumoxane co-catalyst that activates component (i) to a cationic complex. An equivalent term for "alumoxane" is "aluminoxane"; although the exact structure of this co-catalyst is uncertain, subject matter experts generally agree that it is an oligomeric species that contain repeating units of the general formula (III):

$$(R)_2AlO—(Al(R)—O)_n—Al(R)_2 \qquad (III)$$

where the R groups may be the same or different linear, branched or cyclic hydrocarbyl radicals containing 1 to 20 carbon atoms and n is from 0 to about 50. A non-limiting example of an alumoxane is methyl aluminoxane (or MAO) wherein each R group in formula (III) is a methyl radical.

The third catalyst component (iii) of the single site catalyst formulation is an ionic activator. In general, ionic activators are included of a cation and a bulky anion; wherein the latter is substantially non-coordinating. Non-limiting examples of ionic activators are boron ionic activators that are four coordinate with four ligands bonded to the boron atom. Non-limiting examples of boron ionic activators include the following formulas (IV) and (V) shown below;

$$[R^5]^+[B(R^7)_4]^- \qquad (IV)$$

where B represents a boron atom, $R^5$ is an aromatic hydrocarbyl (e.g. triphenyl methyl cation) and each $R^7$ is independently selected from phenyl radicals which are unsubstituted or substituted with from 3 to 5 substituents selected from fluorine atoms, $C_{1-4}$ alkyl or alkoxy radicals which are unsubstituted or substituted by fluorine atoms; and a silyl radical of formula —Si$(R^9)_3$, where each $R^9$ is independently selected from hydrogen atoms and $C_{1-4}$ alkyl radicals, and; compounds of formula (V);

$$[(R^8)_tZH]^+[B(R^7)_4]^- \qquad (V)$$

where B is a boron atom, H is a hydrogen atom, Z is a nitrogen or phosphorus atom, t is 2 or 3 and $R^8$ is selected from $C_{1-8}$ alkyl radicals, phenyl radicals which are unsubstituted or substituted by up to three $C_{1-4}$ alkyl radicals, or one $R^8$ taken together with the nitrogen atom may form an anilinium radical and $R^7$ is as defined above in formula (IV).

In both formula (IV) and (V), a non-limiting example of $R^7$ is a pentafluorophenyl radical. In general, boron ionic activators may be described as salts of tetra(perfluorophenyl) boron; non-limiting examples include anilinium, carbonium, oxonium, phosphonium and sulfonium salts of tetra(perfluorophenyl)boron with anilinium and trityl (or triphenylmethylium). Additional non-limiting examples of ionic activators include: triethylammonium tetra(phenyl) boron, tripropylammonium tetra(phenyl)boron, tri(n-butyl) ammonium tetra(phenyl)boron, trimethylammonium tetra (p-tolyl)boron, trimethylammonium tetra(o-tolyl)boron, tributylammonium tetra(pentafluorophenyl)boron, tripropylammonium tetra(o,p-dimethylphenyl)boron, tributylammonium tetra(m,m-dimethylphenyl)boron, tributylammonium tetra(p-trifluoromethylphenyl)boron, tributylammonium tetra(pentafluorophenyl)boron, tri(n-butyl)ammonium tetra(o-tolyl)boron, N,N-dimethylanilinium tetra(phenyl)boron, N,N-diethylanilinium tetra(phenyl)boron, N,N-diethylanilinium tetra(phenyl)n-butylboron, N,N-2,4,6-pentamethylanilinium tetra(phenyl)boron, di-(isopropyl)ammonium tetra(pentafluorophenyl)boron, dicyclohexylammonium tetra(phenyl)boron, triphenylphosphonium tetra(phenyl)boron, tri(methylphenyl)phosphonium tetra(phenyl)boron, tri(dimethylphenyl)phosphonium tetra(phenyl)boron, tropillium tetrakispentafluorophenyl borate, triphenylmethylium tetrakispentafluorophenyl borate, benzene(diazonium)tetrakispentafluorophenyl borate, tropillium tetrakis(2,3,5,6-tetrafluorophenyl)borate, triphenylmethylium tetrakis(2,3,5,6-tetrafluorophenyl)borate, benzene(diazonium) tetrakis(3,4,5-trifluorophenyl)borate, tropillium tetrakis(3,4,5-trifluorophenyl)borate, benzene(diazonium) tetrakis(3,4,5-trifluorophenyl)borate, tropillium tetrakis(1,2,2-trifluoroethenyl)borate, triphenylmethylium tetrakis(1,2,2-trifluoroethenyl)borate, benzene(diazonium) tetrakis(1,2,2-trifluoroethenyl)borate, tropillium tetrakis(2,3,4,5-tetrafluorophenyl)borate, triphenylmethylium tetrakis(2,3,4,5-tetrafluorophenyl)borate, and benzene(diazonium) tetrakis (2,3,4,5 tetrafluorophenyl)borate. Readily available commercial ionic activators include N,N-dimethylanilinium tetrakispentafluorophenyl borate, and triphenylmethylium tetrakispentafluorophenyl borate.

The optional fourth catalyst component of the single site catalyst formulation is a hindered phenol, component (iv). Non-limiting example of hindered phenols include butylated phenolic antioxidants, butylated hydroxytoluene, 2,4-di-tertiarybutyl-6-ethyl phenol, 4,4'-methylenebis (2,6-di-tertiarybutylphenol), 1,3,5-trimethyl-2,4,6-tris (3,5-di-tert-butyl-4-hydroxybenzyl) benzene and octadecyl-3-(3',5'-di-tert-butyl-4'-hydroxyphenyl) propionate.

To produce an active single site catalyst formulation the quantity and mole ratios of the three or four components, (i) through (iv) are optimized as described in U.S. Pat. No. 9,512,282 which is incorporated by reference into this application in its entirety.

Heterogeneous Catalyst Formulations

A number of heterogeneous catalyst formulations are well known to those skilled in the art, including, as non-limiting examples, Ziegler-Natta and chromium catalyst formulations.

In this disclosure, embodiments include an in-line and batch Ziegler-Natta catalyst formulations. The term "in-line Ziegler-Natta catalyst formulation" refers to the continuous synthesis of a small quantity of active Ziegler-Natta catalyst and immediately injecting this catalyst into at least one continuously operating reactor, where the catalyst polymerizes ethylene and one or more optional α-olefins to form an ethylene interpolymer. The terms "batch Ziegler-Natta catalyst formulation" or "batch Ziegler-Natta procatalyst" refer to the synthesis of a much larger quantity of catalyst or procatalyst in one or more mixing vessels that are external to, or isolated from, the continuously operating solution polymerization process. Once prepared, the batch Ziegler-Natta catalyst formulation, or batch Ziegler-Natta procatalyst, is transferred to a catalyst storage tank. The term "procatalyst" refers to an inactive catalyst formulation (inactive with respect to ethylene polymerization); the procatalyst is converted into an active catalyst by adding an alkyl aluminum co-catalyst. As needed, the procatalyst is pumped from the storage tank to at least one continuously operating reactor, where an active catalyst is formed and polymerizes ethylene and one or more optional α-olefins to form an ethylene interpolymer. The procatalyst may be converted into an active catalyst in the reactor or external to the reactor.

A wide variety of chemical compounds can be used to synthesize an active Ziegler-Natta catalyst formulation. The following describes various chemical compounds that may be combined to produce an active Ziegler-Natta catalyst formulation. Those skilled in the art will understand that the embodiments in this disclosure are not limited to the specific chemical compound disclosed.

An active Ziegler-Natta catalyst formulation may be formed from: a magnesium compound, a chloride compound, a metal compound, an alkyl aluminum co-catalyst and an aluminum alkyl. In Table 1 of this disclosure: "(v)" refers to "component (v)" the magnesium compound; the term "(vi)" refers to the "component (vi)" the chloride compound; "(vii)" refers to "component (vii)" the metal compound; "(viii)" refers to "component (viii)" alkyl aluminum co-catalyst, and; "(ix)" refers to "component (ix)" the aluminum alkyl. As will be appreciated by those skilled in the art, Ziegler-Natta catalyst formulations may contain additional components; a non-limiting example of an additional component is an electron donor, e.g. amines or ethers.

A non-limiting example of an active in-line Ziegler-Natta catalyst formulation can be prepared as follows. In the first step, a solution of a magnesium compound (component (v)) is reacted with a solution of the chloride compound (component (vi)) to form a magnesium chloride support suspended in solution. Non-limiting examples of magnesium compounds include $Mg(R^1)_2$; wherein the $R^1$ groups may be the same or different, linear, branched or cyclic hydrocarbyl radicals containing 1 to 10 carbon atoms. Non-limiting examples of chloride compounds include $R^2Cl$; wherein $R^2$ represents a hydrogen atom, or a linear, branched or cyclic hydrocarbyl radical containing 1 to 10 carbon atoms. In the first step, the solution of magnesium compound may also contain an aluminum alkyl (component (ix)). Non-limiting examples of aluminum alkyl include $Al(R^3)_3$, wherein the $R^3$ groups may be the same or different, linear, branched or cyclic hydrocarbyl radicals containing from 1 to 10 carbon atoms. In the second step a solution of the metal compound (component (vii)) is added to the solution of magnesium chloride and the metal compound is supported on the magnesium chloride. Non-limiting examples of suitable metal compounds include $M(X)_n$ or $MO(X)_n$; where M represents a metal selected from Group 4 through Group 8 of the Periodic Table, or mixtures of metals selected from Group 4 through Group 8; O represents oxygen, and; X represents chloride or bromide; n is an integer from 3 to 6 that satisfies the oxidation state of the metal. Additional non-limiting examples of suitable metal compounds include Group 4 to Group 8 metal alkyls, metal alkoxides (which may be prepared by reacting a metal alkyl with an alcohol) and mixed-ligand metal compounds that contain a mixture of halide, alkyl and alkoxide ligands. In the third step a solution of an alkyl aluminum co-catalyst (component (viii)) is added to the metal compound supported on the magnesium chloride. A wide variety of alkyl aluminum co-catalysts are suitable, as expressed by formula (VI):

wherein the $R^4$ groups may be the same or different, hydrocarbyl groups having from 1 to 10 carbon atoms; the $OR^5$ groups may be the same or different, alkoxy or aryloxy groups wherein $R^5$ is a hydrocarbyl group having from 1 to 10 carbon atoms bonded to oxygen; X is chloride or bromide, and; (p+q+r)=3, with the proviso that p is greater than 0. Non-limiting examples of commonly used alkyl aluminum co-catalysts include trimethyl aluminum, triethyl aluminum, tributyl aluminum, dimethyl aluminum methoxide, diethyl aluminum ethoxide, dibutyl aluminum butoxide, dimethyl aluminum chloride or bromide, diethyl aluminum chloride or bromide, dibutyl aluminum chloride or bromide and ethyl aluminum dichloride or dibromide.

The process described in the paragraph above, to synthesize an active in-line Ziegler-Natta catalyst formulation, can be carried out in a variety of solvents; non-limiting examples of solvents include linear or branched $C_5$ to $C_{12}$ alkanes or mixtures thereof.

To produce an active in-line Ziegler-Natta catalyst formulation the quantity and mole ratios of the five components, (v) through (ix), are optimized as described in U.S. Pat. No. 9,512,282 which is incorporated by reference into this application in its entirety.

Additional embodiments of heterogeneous catalyst formulations include formulations where the "metal compound" is a chromium compound; non-limiting examples include silyl chromate, chromium oxide and chromocene. In some embodiments, the chromium compound is supported on a metal oxide such as silica or alumina. Heterogeneous catalyst formulations containing chromium may also include co-catalysts; non-limiting examples of co-catalysts include trialkylaluminum, alkylaluminoxane and dialkoxyalkylaluminum compounds and the like.

Solution Polymerization Process

The ethylene interpolymer products disclosed herein, useful in the manufacture of rotomolded articles, were produced in a continuous solution polymerization process. This solution process has been fully described in Canadian Patent Application No. CA 2,868,640, filed Oct. 21, 2014 and entitled "SOLUTION POLYMERIZATION PROCESS"; which is incorporated by reference into this application in its entirety.

Embodiments of this process includes at least two continuously stirred reactors, R1 and R2 and an optional tubular reactor R3. Feeds (solvent, ethylene, at least two catalyst formulations, optional hydrogen and optional α-olefin) are fed to at least two reactors continuously. A single site catalyst formulation is injected into R1 and a first heterogeneous catalyst formulation is injected into R2 and optionally R3. Optionally, a second heterogeneous catalyst formulation, different from the first heterogeneous catalyst formulation, is injected into R3.

R1 and R2 may be operated in series or parallel modes of operation. To be more clear, in series mode 100% of the effluent from R1 flows directly into R2. In parallel mode, R1 and R2 operate independently and the effluents from R1 and R2 are combined downstream of the reactors.

The single site catalyst formulation includes an ionic activator (component (iii)), a bulky ligand-metal complex (component (i)), an alumoxane co-catalyst (component (ii)) and an optional hindered phenol (component (iv)), respectively. Injection of the single site catalyst formulation into R1 produces a first ethylene interpolymer in the first reactor and provides a first exit stream containing the first ethylene interpolymer (exiting R1).

A heterogeneous catalyst formulation is injected into R2. In one embodiment a first in-line Ziegler-Natta catalyst formulation is injected into R2. A first in-line Ziegler-Natta catalyst formulation is formed within a first heterogeneous catalyst assembly by optimizing the following molar ratios: (aluminum alkyl)/(magnesium compound) or (ix)/(v); (chloride compound)/(magnesium compound) or (vi)/(v); (alkyl aluminum co-catalyst)/(metal compound) or (viii)/(vii), and; (aluminum alkyl)/(metal compound) or (ix)/(vii); as well as the time these compounds have to react and equilibrate. Within the first heterogeneous catalyst assembly the time between the addition of the chloride compound and the addition of the metal compound (component (vii)) is controlled; hereafter HUT-1 (the first Hold-Up-Time). The time between the addition of component (vii) and the addition of the alkyl aluminum co-catalyst, component (viii), is also controlled; hereafter HUT-2 (the second Hold-Up-Time). In addition, the time between the addition of the alkyl aluminum co-catalyst and the injection of the in-line Ziegler-Natta catalyst formulation into R2 is controlled; hereafter HUT-3 (the third Hold-Up-Time). Optionally, 100% the alkyl aluminum co-catalyst, may be injected directly into R2. Optionally, a portion of the alkyl aluminum co-catalyst may be injected into the first heterogeneous catalyst assembly and the remaining portion injected directly into R2. The quantity of in-line heterogeneous catalyst formulation added to R2 is expressed as the parts-per-million (ppm) of metal compound (component (vii)) in the reactor solution, hereafter "R2 (vii) (ppm)". Injection of the in-line heterogeneous catalyst formulation into R2 produces a second ethylene interpolymer in the second reactor and provides a second exit stream containing the second ethylene interpolymer (exiting R2). In series mode, R2 produces a second exit stream (the stream exiting R2) containing the first ethylene interpolymer and the second ethylene interpolymer. Optionally the second exit stream is deactivated by adding a catalyst deactivator. If the second exit stream is not deactivated the second exit stream enters reactor R3. One embodiment of a suitable R3 design is a tubular reactor. Optionally, one or more of the following fresh feeds may be injected into R3; solvent, ethylene, hydrogen, α-olefin and a first or second heterogeneous catalyst formulation; the latter is supplied from a second heterogeneous catalyst assembly. The chemical composition of the first and second heterogeneous catalyst formulations may be the same, or different, i.e. the catalyst components ((v) through (ix)), mole ratios and hold-up-times may differ in the first and second heterogeneous catalyst assemblies. The second heterogeneous catalyst assembly generates an efficient catalyst by optimizing hold-up-times and the molar ratios of the catalyst components.

In reactor R3, a third ethylene interpolymer may, or may not, form. A third ethylene interpolymer will not form if a catalyst deactivator is added upstream of reactor R3. A third ethylene interpolymer will be formed if a catalyst deactivator is added downstream of R3. The optional third ethylene interpolymer may be formed using a variety of operational modes (with the proviso that catalyst deactivator is not added upstream). Non-limiting examples of operational modes include: (a) residual ethylene, residual optional α-olefin and residual active catalyst entering R3 react to form the third ethylene interpolymer, or; (b) fresh process solvent, fresh ethylene and optionally fresh α-olefin are added to R3 and the residual active catalyst entering R3 forms the third ethylene interpolymer, or; (c) a second in-line heterogeneous catalyst formulation is added to R3 to polymerize residual ethylene and residual optional α-olefin to form the third ethylene interpolymer, or; (d) fresh process solvent, ethylene, optional α-olefin and a second in-line heterogeneous catalyst formulation are added to R3 to form the third ethylene interpolymer.

In series mode, R3 produces a third exit stream (the stream exiting R3) containing the first ethylene interpolymer, the second ethylene interpolymer and optionally a third ethylene interpolymer. A catalyst deactivator may be added to the third exit stream producing a deactivated solution; with the proviso a catalyst deactivator is not added if a catalyst deactivator was added upstream of R3.

The deactivated solution passes through a pressure let down device, a heat exchanger and a passivator is added forming a passivated solution. The passivated solution passes through a series of vapor liquid separators and ultimately the ethylene interpolymer product enters polymer recovery. Non-limiting examples of polymer recovery operations include one or more gear pump, single screw extruder or twin screw extruder that forces the molten ethylene interpolymer product through a pelletizer.

Embodiments of the manufactured articles disclosed herein, may also be formed from ethylene interpolymer products synthesized using a batch Ziegler-Natta catalyst. Typically, a first batch Ziegler-Natta procatalyst is injected into R2 and the procatalyst is activated within R2 by injecting an alkyl aluminum co-catalyst forming a first batch Ziegler-Natta catalyst. Optionally, a second batch Ziegler-Natta procatalyst is injected into R3.

A variety of solvents may be used as the process solvent; non-limiting examples include linear, branched or cyclic $C_5$ to $C_{12}$ alkanes. Non-limiting examples of α-olefins include $C_3$ to $C_{10}$ α-olefins. It is well known to individuals of ordinary experience in the art that reactor feed streams (solvent, monomer, α-olefin, hydrogen, catalyst formulation etc.) is essentially free of catalyst deactivating poisons; non-limiting examples of poisons include trace amounts of oxygenates such as water, fatty acids, alcohols, ketones and aldehydes. Such poisons are removed from reactor feed streams using standard purification practices; non-limiting examples include molecular sieve beds, alumina beds and oxygen removal catalysts for the purification of solvents, ethylene and α-olefins, etc.

In the continuous polymerization processes described, polymerization is terminated by adding a catalyst deactivator. The catalyst deactivator substantially stops the polymerization reaction by changing active catalyst species to inactive forms. Suitable deactivators are well known in the art, non-limiting examples include: amines (e.g., U.S. Pat. No. 4,803,259 to Zboril et al.); alkali or alkaline earth metal salts of carboxylic acid (e.g., U.S. Pat. No. 4,104,609 to Machan et al.); water (e.g., U.S. Pat. No. 4,731,438 to Bernier et al.); hydrotalcites, alcohols and carboxylic acids (e.g., U.S. Pat. No. 4,379,882 to Miyata); or a combination thereof (U.S. Pat. No. 6,180,730 to Sibtain et al.).

Prior to entering the vapor/liquid separator, a passivator or acid scavenger may be added to deactivated solution. Suitable passivators are well known in the art, non-limiting examples include alkali or alkaline earth metal salts of carboxylic acids or hydrotalcites.

In this disclosure, the number of solution reactors is not particularly important; with the proviso that the continuous solution polymerization process includes at least two reactors that employ at least one single-site catalyst formulation and at least one heterogeneous catalyst formulation.

The First Ethylene Interpolymer

The first ethylene interpolymer is produced with a single-site catalyst formulation. If the optional α-olefin is not added to reactor 1 (R1), then the ethylene interpolymer produced in R1 is an ethylene homopolymer. If an α-olefin is added, the following weight ratio is one parameter to control the density of the first ethylene interpolymer: $((\alpha\text{-olefin})/(\text{ethylene}))^{R1}$. The symbol "$\sigma^1$" refers to the density of the first ethylene interpolymer produced in R1. In embodiments of the disclosure, the upper limit on $\sigma^1$ may be about 0.955 g/cm³; in some cases about 0.945 g/cm³ and; in other cases about 0.941 g/cm³. In embodiments of the disclosure, the lower limit on $\sigma^1$ may be about 0.855 g/cm³, in some cases about 0.865 g/cm³, and; in other cases, about 0.875 g/cm³ or about 0.885 g/cm³.

In embodiments of the disclosure the density, $\sigma^1$ of the first ethylene interpolymer may be from about 0.865 g/cm³ to about 0.941 g/cm³, or from about 0.865 g/cm³ to about 0.936 g/cm³, or from about 0.865 g/cm³ to about 0.931 g/cm³, or from about 0.865 g/cm³ to about 0.926 g/cm³, or from about 0.865 g/cm³ to about 0.921 g/cm³, or from about 0.865 g/cm³ to about 0.914 g/cm³, or from about 0.865 g/cm³ to about 0.913 g/cm³, or from about 0.865 g/cm³ to about 0.912 g/cm³, or from about 0.865 g/cm³ to about 0.910 g/cm³, or from about 0.865 g/cm³ to about 0.906 g/cm³, or from about 0.875 g/cm³ to about 0.941 g/cm³, or from about 0.875 g/cm³ to about 0.936 g/cm³, or from about 0.875 g/cm³ to about 0.931 g/cm³, or from about 0.875 g/cm³ to about 0.926 g/cm³, or from about 0.875 g/cm³ to about 0.921 g/cm³, or from about 0.875 g/cm³ to about 0.914 g/cm³, or from about 0.875 g/cm³ to about 0.913 g/cm³, or from about 0.875 g/cm³ to about 0.912 g/cm³, or from about 0.875 g/cm³ to about 0.910 g/cm³, or from about 0.875 g/cm³ to about 0.906 g/cm³, or from about 0.885 g/cm³ to about 0.941 g/cm³, or from about 0.885 g/cm³ to about 0.936 g/cm³, or from about 0.885 g/cm³ to about 0.931 g/cm³, or from about 0.885 g/cm³ to about 0.926 g/cm³, or from about 0.885 g/cm³ to about 0.921 g/cm³, or from about 0.885 g/cm³ to about 0.914 g/cm³, or from about 0.885 g/cm³ to about 0.913 g/cm³, or from about 0.885 g/cm³ to about 0.912 g/cm³, or from about 0.885 g/cm³ to about 0.910 g/cm³, or from about 0.885 g/cm³ to about 0.906 g/cm³.

Methods to determine the $CDBI_{50}$ (Composition Distribution Branching Index) of an ethylene interpolymer are well known to those skilled in the art. The $CDBI_{50}$, expressed as a percent, is defined as the percent of the ethylene interpolymer whose comonomer composition is within 50% of the median comonomer composition. It is also well known to those skilled in the art that the $CDBI_{50}$ of ethylene interpolymers produced with single-site catalyst formulations are higher relative to the $CDBI_{50}$ of α-olefin containing ethylene interpolymers produced with heterogeneous catalyst formulations. In embodiments of the disclosure, the upper limit on the $CDBI_{50}$ of the first ethylene interpolymer (produced with a single-site catalyst formulation) may be about 98%, in other cases about 95% and in still other cases about 90%. In embodiments of the disclosure, the lower limit on the $CDBI_{50}$ of the first ethylene interpolymer may be about 70%, in other cases about 75% and in still other cases about 80%.

As is well known to those skilled in the art the $M_w/M_n$ of ethylene interpolymers produced with single site catalyst formulations are lower relative to ethylene interpolymers produced with heterogeneous catalyst formulations. Thus, in the embodiments disclosed, the first ethylene interpolymer has a lower $M_w/M_n$ relative to the second ethylene interpolymer; where the second ethylene interpolymer is produced with a heterogeneous catalyst formulation. In embodiments of the disclosure, the upper limit on the $M_w/M_n$ of the first ethylene interpolymer may be about 2.8, in other cases about 2.5 and in still other cases about 2.2. In embodiments of the disclosure, the lower limit on the $M_w/M_n$ the first ethylene interpolymer may be about 1.7, in other cases about 1.8 and in still other cases about 1.9.

In embodiments of the disclosure, the first ethylene interpolymer has a molecular weight distribution, $M_w/M_n$ of from about 1.7 to about 2.3, or from about 1.8 to about 2.3, of from about 1.8 to about 2.2, or about 2.0.

The first ethylene interpolymer contains catalyst residues that reflect the chemical composition of the single-site catalyst formulation used. Those skilled in the art will understand that catalyst residues are typically quantified by the parts per million of metal in the first ethylene interpolymer, where metal refers to the metal in component (i), i.e. the metal in the "bulky ligand-metal complex"; hereafter this metal will be referred to "metal A". As recited earlier in this disclosure, non-limiting examples of metal A include Group 4 metals, titanium, zirconium and hafnium. In embodiments of the disclosure, the upper limit on the ppm of metal A in the first ethylene interpolymer may be about 1.0 ppm, in other cases about 0.9 ppm and in still other cases about 0.8 ppm. In embodiments of the disclosure, the lower limit on the ppm of metal A in the first ethylene interpolymer may be about 0.01 ppm, in other cases about 0.1 ppm and in still other cases about 0.2 ppm.

The amount of hydrogen added to R1 can vary over a wide range allowing the continuous solution process to produce first ethylene interpolymers that differ greatly in melt index, $I_2^1$ (melt index is measured at 190° C. using a 2.16 kg load following the procedures outlined in ASTM D1238). The quantity of hydrogen added to R1 is expressed as the parts-per-million (ppm) of hydrogen in R1 relative to the total mass in reactor R1; hereafter $H_2^{R1}$ (ppm). In embodiments of the disclosure, the upper limit on $I_2^1$ may be about 200 dg/min, in some cases about 100 dg/min; in other cases about 50 dg/min, and; in still other cases about 1 dg/min. In embodiments, the lower limit on $I_2^1$ may be about 0.01 dg/min, in some cases about 0.05 dg/min; in other cases about 0.1 dg/min, and; in still other cases about 0.5 dg/min, or about 1.0 dg/min.

In embodiments of the disclosure, the first ethylene interpolymer has a number average molecular weight, $M_n$, of from about 7,500 to about 75,000, or from about 10,000 to about 65,000, or from about 15,000 to about 50,000, or from about 20,000 to about 50,000, or from about 25,000 to about 50,000, or from about 30,000 to about 50,000.

In embodiments of the disclosure, the upper limit on the weight percent (wt %) of the first ethylene interpolymer in the ethylene interpolymer product may be about 75 wt %, or about 60 wt %, in other cases about 55 wt % and in still other cases about 50 wt %. In embodiments of the disclosure, the lower limit on the wt % of the first ethylene interpolymer in the ethylene interpolymer product may be about 15 wt %; in other cases about 25 wt % and in still other cases about 30 wt %.

The Second Ethylene Interpolymer

The second ethylene interpolymer is produced with a heterogeneous catalyst formulation. If optional α-olefin is not added to reactor 2 (R2) either by adding fresh α-olefin to R2 (or carried over from R1) then the ethylene interpolymer produced in R2 is an ethylene homopolymer. If an optional α-olefin is present in R2, the following weight ratio is one parameter to control the density of the second ethylene interpolymer produced in R2: ((α-olefin)/(ethylene)) $R^2$. Hereafter, the symbol "$\sigma^2$" refers to the density of the ethylene interpolymer produced in R2. In embodiments of the disclosure, the upper limit on $\sigma^2$ may be about 0.965 g/cm³; in some cases about 0.955 g/cm³ and; in other cases about 0.945 g/cm³. Depending on the heterogeneous catalyst formulation used, in embodiments of the disclosure, the lower limit on $\sigma^2$ may be about 0.875 g/cm³, or about 0.885 g/cm³, in some cases about 0.900 g/cm³, and; in other cases about 0.906 g/cm³.

In embodiments of the disclosure the density, $\sigma^2$ of the second ethylene interpolymer is from about 0.875 g/cm³ to about 0.941 g/cm³, or from about 0.875 g/cm³ to about 0.936 g/cm³, or from about 0.875 g/cm³ to about 0.931 g/cm³, or from about 0.875 g/cm³ to about 0.926 g/cm³, or from about 0.875 g/cm³ to about 0.921 g/cm³, or from about 0.875 g/cm³ to about 0.914 g/cm³, or from about 0.875 g/cm³ to about 0.913 g/cm³, or from about 0.875 g/cm³ to about 0.912 g/cm³, or from about 0.885 g/cm³ to about 0.941 g/cm³, or from about 0.885 g/cm³ to about 0.936 g/cm³, or from about 0.885 g/cm³ to about 0.931 g/cm³, or from about 0.885 g/cm³ to about 0.926 g/cm³, or from about 0.885 g/cm³ to about 0.921 g/cm³, or from about 0.885 g/cm³ to about 0.914 g/cm³, or from about 0.885 g/cm³ to about 0.913 g/cm³, or from about 0.885 g/cm³ to about 0.912 g/cm³, or from about 0.895 g/cm³ to about 0.941 g/cm³, or from about 0.895 g/cm³ to about 0.936 g/cm³, or from about 0.895 g/cm³ to about 0.931 g/cm³, or from about 0.895 g/cm³ to about 0.926 g/cm³, or from about 0.895 g/cm³ to about 0.921 g/cm³, or from about 0.895 g/cm³ to about 0.914 g/cm³, or from about 0.895 g/cm³ to about 0.913 g/cm³, or from about 0.895 g/cm³ to about 0.912 g/cm³.

A heterogeneous catalyst formulation is used to produce the second ethylene interpolymer. If the second ethylene interpolymer contains an α-olefin, the $CDBI_{50}$ of the second ethylene interpolymer is lower relative to the $CDBI_{50}$ of the first ethylene interpolymer that was produced with a single-site catalyst formulation. In an embodiment of this disclosure, the upper limit on the $CDBI_{50}$ of the second ethylene interpolymer (that contains an α-olefin) may be about 70%, in other cases about 65% and in still other cases about 60%. In an embodiment of this disclosure, the lower limit on the $CDBI_{50}$ of the second ethylene interpolymer (that contains an α-olefin) may be about 40% or 45%, in other cases about 50% and in still other cases about 55%. If an α-olefin is not added to the continuous solution polymerization process the second ethylene interpolymer is an ethylene homopolymer. In the case of a homopolymer, which does not contain α-olefin, one can still measure a $CDBI_{50}$ using TREF. In the case of a homopolymer, the upper limit on the $CDBI_{50}$ of the second ethylene interpolymer may be about 98%, in other cases about 96% and in still other cases about 95%, and; the lower limit on the $CDBI_{50}$ may be about 88%, in other cases about 89% and in still other cases about 90%. It is well known to those skilled in the art that as the α-olefin content in the second ethylene interpolymer approaches zero, there is a smooth transition between the recited $CDBI_{50}$ limits for the second ethylene interpolymers (that contain an α-olefin) and the recited $CDBI_{50}$ limits for the second ethylene interpolymers that are ethylene homopolymers. Typically, the $CDBI_{50}$ of the first ethylene interpolymer is higher than the $CDBI_{50}$ of the second ethylene interpolymer.

In an embodiment of the disclosure, the second ethylene interpolymer is a made with a first Ziegler-Natta catalyst formulation.

The $M_w/M_n$ of second ethylene interpolymer is higher than the $M_w/M_n$ of the first ethylene interpolymer. In embodiments of the disclosure, the upper limit on the $M_w/M_n$ of the second ethylene interpolymer may be about 4.4, in other cases about 4.2 and in still other cases about 4.0. In embodiments of the disclosure, the lower limit on the $M_w/M_n$ of the second ethylene interpolymer may be about 2.2. $M_w/M_n$'s of 2.2 may be observed when the melt index, $I_2$ of the second ethylene interpolymer is high, or when the melt index, $I_2$ of the ethylene interpolymer product is high, e.g. greater than 10 g/10 minutes. In other embodiments of the disclosure, the lower limit on the $M_w/M_n$ of the second ethylene interpolymer may be about 2.4 and in still other cases about 2.6.

In embodiments of the disclosure, the second ethylene interpolymer has a molecular weight distribution, $M_w/M_n$ or from 2.3 to 5.5, or from 2.3 to 5.0, or from 2.3 to 4.5, or from 2.3 to 4.0, or from 2.3 to 3.5, or from 2.3 to 3.0, or from 2.5 to 5.0, or from 2.5 to 4.5, or from 2.5 to 4.0, or from 2.5 to 3.5.

The second ethylene interpolymer contains catalyst residues that reflect the chemical composition of the heterogeneous catalyst formulation. Those skilled in the art with understand that heterogeneous catalyst residues are typically quantified by the parts per million of metal in the second ethylene interpolymer, where the metal refers to the metal originating from component (vii), i.e. the "metal compound"; hereafter (and in the claims) this metal will be referred to as "metal B". As recited earlier in this disclosure, non-limiting examples of metal B include metals selected from Group 4 through Group 8 of the Periodic Table, or mixtures of metals selected from Group 4 through Group 8. In embodiments of the disclosure, the upper limit on the ppm of metal B in the second ethylene interpolymer may be about 12 ppm, in other cases about 10 ppm and in still other cases about 8 ppm. In embodiments of the disclosure, the lower limit on the ppm of metal B in the second ethylene interpolymer may be about 0.5 ppm, in other cases about 1 ppm and in still other cases about 3 ppm. While not wishing to be bound by any particular theory, in series mode of operation it is believed that the chemical environment within the second reactor deactivates the single site catalyst formulation, or; in parallel mode of operation the chemical environment within R2 deactivates the single site catalyst formulation.

The amount of hydrogen added to R2 can vary over a wide range which allows the continuous solution process to produce second ethylene interpolymers that differ greatly in melt index, hereafter $I_2^2$. The quantity of hydrogen added is expressed as the parts-per-million (ppm) of hydrogen in R2 relative to the total mass in reactor R2; hereafter $H_2^{R2}$ (ppm). In embodiments of the disclosure, the upper limit on $I_2^2$ may be about 1000 dg/min; in some cases about 750 dg/min; in other cases about 500 dg/min, and; in still other cases about 200 dg/min. In embodiments of the disclosure, the lower limit on $I_2^2$ may be about 0.3 dg/min, in some cases about 0.4 dg/min, in other cases about 0.5 dg/min, and; in still other cases about 0.6 dg/min or about 1.0 dg/min.

In embodiments of the disclosure, the second ethylene interpolymer has a number average molecular weight, $M_n$ of from about 5,000 to about 75,000, or from about 5,000 to about 50,000, or from about 10,000 to about 50,000, or from about 15,000 to about 50,000, or from about 15,000 to about 35,000, or from about 20,000 to about 30,000.

In embodiments of the disclosure, the upper limit on the weight percent (wt %) of the second ethylene interpolymer in the ethylene interpolymer product may be about 85 wt %, in other cases about 80 wt % and in still other cases about 75 wt %, or about 70 wt %. In embodiments of the disclosure, the lower limit on the wt % of the second ethylene interpolymer in the ethylene interpolymer product may be about 20 wt %, or about 30 wt %; in other cases about 40 wt % and in still other cases about 45 wt %.

The Third Ethylene Interpolymer

In an embodiment of the disclosure, a heterogeneous catalyst formulation is used to produce the third ethylene interpolymer.

A third ethylene interpolymer is not produced in R3 if a catalyst deactivator is added upstream of R3. If a catalyst deactivator is not added and optional α-olefin is not present then the third ethylene interpolymer produced in R3 is an ethylene homopolymer. If a catalyst deactivator is not added and optional α-olefin is present in R3, the following weight ratio determines the density of the third ethylene interpolymer: $((\alpha\text{-olefin})/(\text{ethylene}))^{R3}$. In the continuous solution polymerization process $((\alpha\text{-olefin})/(\text{ethylene}))^{R3}$ is one of the control parameters used to produce a third ethylene interpolymer with a desired density. Hereafter, the symbol "$\sigma^3$" refers to the density of the ethylene interpolymer produced in R3. In embodiments of the disclosure, the upper limit $\sigma^3$ may be about 0.975 g/cm³; in some cases, about 0.965 g/cm³ and; in other cases, about 0.955 g/cm³. Depending on the heterogeneous catalyst formulations used, in embodiments of the disclosure, the lower limit $\sigma^3$ may be about 0.89 g/cm³, in some cases about 0.90 g/cm³, and; in other cases about 0.91 g/cm³.

Optionally, a second heterogeneous catalyst formulation (i.e. different from the one used to make the second ethylene interpolymer) may be added to R3.

If the third ethylene interpolymer contains an α-olefin, the upper limit on the $CDBI_{50}$ of the optional third ethylene interpolymer may be about 70% or about 65%, in other cases about 60% and in still other cases about 55%. The $CDBI_{50}$ of an α-olefin containing optional third ethylene interpolymer will be lower than the $CDBI_{50}$ of the first ethylene interpolymer produced with the single-site catalyst formulation. Typically, the lower limit on the $CDBI_{50}$ of the optional third ethylene interpolymer (containing an α-olefin) may be about 35%, in other cases about 40% and in still other cases about 45%. If an α-olefin is not added to the continuous solution polymerization process the optional third ethylene interpolymer is an ethylene homopolymer. In the case of an ethylene homopolymer the upper limit on the $CDBI_{50}$ may be about 98%, in other cases about 96% and in still other cases about 95%, and; the lower limit on the $CDBI_{50}$ may be about 88%, in other cases about 89% and in still other cases about 90%. Typically, the $CDBI_{50}$ of the first ethylene interpolymer is higher than the $CDBI_{50}$ of the third ethylene interpolymer and second ethylene interpolymer.

In an embodiment, the third ethylene interpolymer is made using a heterogeneous catalyst which is a first Ziegler-Natta catalyst formulation (i.e., a Ziegler-Natta catalyst formulation analogous to the one used to make the second ethylene interpolymer) or a second Ziegler-Natta catalyst formulation which is different from the first Ziegler-Natta catalyst formulation.

In embodiments of the disclosure, the upper limit on the $M_w/M_n$ of the optional third ethylene interpolymer may be about 5.0, in other cases about 4.8 and in still other cases about 4.5. In embodiments of the disclosure, the lower limit on the $M_w/M_n$ of the optional third ethylene interpolymer may be about 2.2, in other cases about 2.4 and in still other cases about 2.6. In an embodiment, the $M_w/M_n$ of the optional third ethylene interpolymer is higher than the $M_w/M_n$ of the first ethylene interpolymer.

The catalyst residues in the optional third ethylene interpolymer reflect the chemical composition of the heterogeneous catalyst formulation(s) used, i.e. the first and optionally a second heterogeneous catalyst formulation. The chemical compositions of the first and second heterogeneous catalyst formulations may be the same or different; for example a first component (vii) and a second component (vii) may be used to synthesize the first and second heterogeneous catalyst formulation. As recited above, "metal B"

refers to the metal that originates from the first component (vii). Hereafter, "metal C" refers to the metal that originates from the second component (vii). Metal B and optional metal C may be the same, or different. Non-limiting examples of metal B and metal C include metals selected from Group 4 through Group 8 of the Periodic Table, or mixtures of metals selected from Group 4 through Group 8. In embodiments of the disclosure, the upper limit on the ppm of (metal B+metal C) in the optional third ethylene interpolymer may be about 12 ppm, in other cases about 10 ppm and in still other cases about 8 ppm. In embodiments of the disclosure, the lower limit on the ppm of (metal B+metal C) in the optional third ethylene interpolymer may be about 0.5 ppm, in other cases about 1 ppm and in still other cases about 3 ppm.

Optionally hydrogen may be added to R3. Adjusting the amount of hydrogen in R3, hereafter $H_2^{R3}$ (ppm), allows the continuous solution process to produce third ethylene interpolymers that differ widely in melt index, hereafter $I_2^3$. In embodiments of the disclosure, the upper limit on $I_2^3$ may be about 2000 dg/min; in some cases, about 1500 dg/min; in other cases, about 1000 dg/min, and; in still other cases about 500 dg/min. In embodiments of the disclosure, the lower limit on $I_2^3$ may be about 0.5 dg/min, in some cases about 0.6 dg/min, in other cases about 0.7 dg/min, and; in still other cases about 0.8 dg/min.

In embodiments of the disclosure, the upper limit on the weight percent (wt %) of the optional third ethylene interpolymer in the ethylene interpolymer product may be about 30 wt %, in other cases about 25 wt % and in still other cases about 20 wt %. In embodiments of the disclosure, the lower limit on the wt % of the optional third ethylene interpolymer in the ethylene interpolymer product may be 0 wt %; in other cases, about 5 wt % and in still other cases about 10 wt %.

The Ethylene Interpolymer Product

The ethylene interpolymer product used in this disclosure includes a first ethylene interpolymer made with a single site catalyst and a second ethylene interpolymer made with a heterogeneous catalyst.

In an embodiment the ethylene interpolymer product used in this disclosure includes a third ethylene interpolymer made with a heterogeneous catalyst.

In embodiment of the disclosure, the ethylene interpolymer product is made using a solution polymerization process.

In an embodiment of the disclosure, the ethylene interpolymer product includes ethylene and one or more alpha-olefins.

In an embodiment of the disclosure, the ethylene interpolymer product includes ethylene and 1-octene.

In embodiments of the disclosure, the upper limit on the density of the ethylene interpolymer product may be about 0.920 g/cm$^3$, or less than about 0.920 g/cm$^3$, or about 0.914 g/cm$^3$, or less than about 0.914 g/cm$^3$, or about 0.912 g/cm$^3$, or less than about 0.912 g/cm$^3$. In embodiments of the disclosure, the lower limit on the density of the ethylene interpolymer product may be about 0.905 g/cm$^3$, or about 0.910 g/cm$^3$.

The upper limit on the CDBI$_{50}$ of the ethylene interpolymer product may in embodiments of the disclosure be about 97%, in other cases about 90% and in still other cases about 85%. An ethylene interpolymer product with a CDBI$_{50}$ of 97% may result if an α-olefin is not added to the continuous solution polymerization process; in this case, the ethylene interpolymer product is an ethylene homopolymer. In embodiments of the disclosure, the lower limit on the CDBI$_{50}$ of an ethylene interpolymer may be about 20%, in other cases about 40% and in still other cases about 60%, or about 65%.

In embodiments of the disclosure, the upper limit on the $M_w/M_n$ of the ethylene interpolymer product may be about 10.0, in other cases about 5.0, or about 4.0, or about 3.0. In embodiments of the disclosure, the lower limit on the $M_w/M_n$ of the ethylene interpolymer product may be 2.0, in other cases about 2.2 and in still other cases about 2.4.

In an embodiment of the disclosure, the $M_w/M_n$ of the ethylene interpolymer product is less than about 4.0, or less than about 3.5, or less than about 3.0.

In an embodiment of the disclosure, the ethylene interpolymer product includes three melting peaks when analyzed by differential scanning calorimetry (DSC).

In an embodiment of the disclosure, the ethylene interpolymer product includes three melting peaks when analyzed by differential scanning calorimetry (DSC) and each of the three melting peaks have a minimum at a temperature of 100° C. or greater.

In an embodiment of the disclosure, the ethylene interpolymer product has a unimodal profile in a gel permeation chromatograph generated according to the method of ASTM D6474-99. The term "unimodal" is herein defined to mean there will be only one significant peak or maximum evident in the GPC-curve. A unimodal profile includes a broad unimodal profile. In contrast, the use of the term "bimodal" is meant to convey that in addition to a first peak, there will be a secondary peak or shoulder which represents a higher or lower molecular weight component (i.e. the molecular weight distribution, can be said to have two maxima in a molecular weight distribution curve). Alternatively, the term "bimodal" connotes the presence of two maxima in a molecular weight distribution curve generated according to the method of ASTM D6474-99. The term "multi-modal" denotes the presence of two or more, typically more than two, maxima in a molecular weight distribution curve generated according to the method of ASTM D6474-99.

In embodiments of the disclosure, the ethylene interpolymer product will have a normal or a flat comonomer distribution profile as measured using GPC-FTIR. If the comonomer incorporation decreases with molecular weight, as measured using GPC-FTIR, the distribution is described as "normal". If the comonomer incorporation is approximately constant with molecular weight, as measured using GPC-FTIR, the comonomer distribution is described as "flat" or "uniform". The terms "reverse comonomer distribution" and "partially reverse comonomer distribution" mean that in the GPC-FTIR data obtained for a copolymer, there is one or more higher molecular weight components having a higher comonomer incorporation than in one or more lower molecular weight components. The term "reverse(d) comonomer distribution" is used herein to mean, that across the molecular weight range of an ethylene copolymer, comonomer contents for the various polymer fractions are not substantially uniform and the higher molecular weight fractions thereof have proportionally higher comonomer contents (i.e. if the comonomer incorporation rises with molecular weight, the distribution is described as "reverse" or "reversed"). Where the comonomer incorporation rises with increasing molecular weight and then declines, the comonomer distribution is still considered "reverse", but may also be described as "partially reverse". A partially reverse comonomer distribution will exhibit a peak or maximum.

The catalyst residues in the ethylene interpolymer product reflect the chemical compositions of: the single-site catalyst formulation employed in R1; the first heterogeneous catalyst formulation employed in R2, and; optionally the first or optionally the first and/or second heterogeneous catalyst formulation employed in R3. In this disclosure, catalyst residues were quantified by measuring the parts per million of catalytic metal in the ethylene interpolymer products. In addition, the elemental quantities (ppm) of magnesium, chlorine and aluminum were quantified. Catalytic metals originate from two or optionally three sources, specifically: 1) "metal A" that originates from component (i) that was used to form the single-site catalyst formulation; (2) "metal B" that originates from the first component (vii) that was used to form the first heterogeneous catalyst formulation, and; (3) optionally "metal C" that originates from the second component (vii) that was used to form the optional second heterogeneous catalyst formulation. Metals A, B and C may be the same or different. In this disclosure the term "total catalytic metal" is equivalent to the sum of catalytic metals A+B+C. Further, in this disclosure the terms "first total catalytic metal" and "second total catalyst metal" are used to differentiate between the first ethylene interpolymer product of this disclosure and a comparative "polyethylene composition" that were produced using different catalyst formulations.

In embodiments of the disclosure, the upper limit on the ppm of metal A in the ethylene interpolymer product may be about 0.6 ppm, in other cases about 0.5 ppm and in still other cases about 0.4 ppm. In embodiments of the disclosure, the lower limit on the ppm of metal A in the ethylene interpolymer product may be about 0.001 ppm, in other cases about 0.01 ppm and in still other cases about 0.03 ppm. In embodiments of the disclosure, the upper limit on the ppm of (metal B+metal C) in the ethylene interpolymer product may be about 11 ppm, in other cases about 9 ppm and in still other cases about 7 ppm. In embodiments of the disclosure, the lower limit on the ppm of (metal B+metal C) in the ethylene interpolymer product may be about 0.5 ppm, in other cases about 1 ppm and in still other cases about 3 ppm.

In some embodiments, ethylene interpolymers may be produced where the catalytic metals (metal A, metal B and metal C) are the same metal; a non-limiting example would be titanium. In such embodiments, the ppm of (metal B+metal C) in the ethylene interpolymer product is calculated using equation (VII):

$$ppm^{(B+C)} = ((ppm^{(A+B+C)} - (f^A \times ppm^A))/(1-f^A)$$ (VII)

where: $ppm^{(B+C)}$ is the calculated ppm of (metal B+metal C) in the ethylene interpolymer product; $ppm^{(A+B+C)}$ is the total ppm of catalyst residue in the ethylene interpolymer product as measured experimentally, i.e. (metal A ppm+metal B ppm+metal C ppm); $f^A$ represents the weight fraction of the first ethylene interpolymer in the ethylene interpolymer product, $f^A$ may vary from about 0.15 to about 0.6, and; $ppm^A$ represents the ppm of metal A in the first ethylene interpolymer. In equation (VII) $ppm^A$ is assumed to be 0.35 ppm.

Embodiments of the ethylene interpolymer products disclosed herein have lower catalyst residues relative to the polyethylene polymers described in U.S. Pat. No. 6,277,931. Higher catalyst residues in U.S. Pat. No. 6,277,931 increase the complexity of the continuous solution polymerization process; an example of increased complexity includes additional purification steps to remove catalyst residues from the polymer. In contrast, in the present disclosure, catalyst residues are not removed. In embodiments of this disclosure, the upper limit on the "total catalytic metal", i.e. the total ppm of (metal A ppm+metal B ppm+optional metal C ppm) in the ethylene interpolymer product may be about 11 ppm, in other cases about 9 ppm and in still other cases about 7, and; the lower limit on the total ppm of catalyst residuals (metal A+metal B+optional metal C) in the ethylene interpolymer product may be about 0.5 ppm, in other cases about 1 ppm and in still other cases about 3 ppm.

In embodiments of the disclosure, the ethylene interpolymer products are further characterized by having 3 parts per million (ppm) of total catalytic metal (Ti); where the quantity of catalytic metal was determined by Neutron Activation Analysis (N.A.A.) as specified herein.

In embodiments of the disclosure, the upper limit on melt index, $I_2$ of the ethylene interpolymer product is about 10.0 g/10 min, or about 8.0 g/10 min, or about 7.5 g/10 min, or about 6.0 g/10 min, or about 5.0 g/10 min, or about 4.5 g/10 min. In embodiments of the disclosure, the lower limit on the melt index, $I_2$ of the ethylene interpolymer product is about 1.5 g/10 min, or about 2.0 g/10 min, or about 2.5 g/10 min, or about 3.0 g/10 min.

In embodiments of the disclosure, the ethylene interpolymer products are further characterized by a terminal vinyl unsaturation greater than or equal to 0.024 terminal vinyl groups per 100 carbon atoms 0.024 terminal vinyls/100 Carbon backbone atoms); as determine via Fourier Transform Infrared (FTIR) spectroscopy according to ASTM D3124-98 and ASTM D6248-98.

In embodiments of the disclosure, the ethylene interpolymer product or a plaque made from the ethylene interpolymer product has a flexural secant modulus at 1%, of less than 600 MPa, or less than 500 MPa, or less than 400 MPa, or less than 350 MPa, or less than 300 MPa, or less than 250 MPa.

In embodiments of the disclosure, the ethylene interpolymer product or a plaque made from the ethylene interpolymer product has a tensile secant modulus at 1%, of less than 600 MPa, or less than 500 MPa, or less than 400 MPa, or less than 350 MPa, or less than 300 MPa, or less than 250 MPa.

In embodiments of the disclosure, the ethylene interpolymer product or a plaque made from the ethylene interpolymer product has a tensile elongation at yield of greater than 12%, or greater than 13%, or greater than 14%, or greater than 15%, or greater than 16%, or at least 16%.

In embodiments of the disclosure, the ethylene interpolymer product or a plaque made from the ethylene interpolymer product has a VICAT softening temperature of less than 100° C., or less than 97° C., or less than 95° C.

In embodiments of the disclosure, the ethylene interpolymer product or a plaque made from the ethylene interpolymer product has a VICAT softening temperature of from 85° C. to 100° C., of from 85° C. to 99° C., or from 85° C. to 97° C., or from 85° C. to 96° C., or from 85° C. to 95° C., or from 85° C. to 94° C.

In embodiments of the disclosure, the ethylene interpolymer product or a plaque made from the ethylene interpolymer product has an upper limit for the VICAT softening temperature of less than 100° C., or less than 97° C., or less than 95° C.

In embodiments of the disclosure, the ethylene interpolymer product or a plaque made from the ethylene interpolymer product has a lower limit for the VICAT softening temperature of 85° C.

In embodiments of the disclosure, the ethylene interpolymer product or a plaque made from the ethylene interpolymer product has a Shore D hardness score of less than 75, or less than 65, or less than 60, or ≤65, or ≤60.

In embodiments of the disclosure, the ethylene interpolymer product or a plaque made from the ethylene interpolymer product has a Shore D hardness score of from 42 to less than 75, or from 42 to less than 65, or from 42 to less than 60, or from 42 to 65, or from 42 to 60.

In embodiments of the disclosure, the ethylene interpolymer product or a plaque made from the ethylene interpolymer product has a Shore D hardness score with an upper limit of less than 75, or less than 65, or less than 60, or ≤65, or ≤60.

In embodiments of the disclosure, the ethylene interpolymer product or a plaque made from the ethylene interpolymer product has a Shore D hardness score with a lower limit of 42.

In embodiments of the disclosure, the ethylene interpolymer has a zero shear viscosity, $\eta_0$ at 190° C. of from about 750 Pa·s to about 6000 Pa·s, or from about 1000 Pa·s to about 5500 Pa·s, or from about 1000 Pa·s to about 5000 Pa·s, or from about 1000 Pa·s to about 4000 Pa·s, or from about 1000 Pa·s to about 3500 Pa·s, or from about 1000 Pa·s to about 3000 Pa·s, or from about 1500 Pa·s to about 3500 Pa·s, or from about 1500 Pa·s to about 3000 Pa·s.

In embodiments of the disclosure, the ethylene interpolymer product has a relative elasticity, defined as the ratio of G' over G" at a frequency of 0.05 rad/s (and at 190° C.), of less than 0.50, or less than 0.40, or less than 0.30, or less than 0.20, or less than 0.10, or less than 0.050, or ≤0.10, or ≤0.050, or ≤0.025, or ≤0.020.

In embodiments of the disclosure, the ethylene interpolymer product has a melt strength of at least 0.8 cN, or at least 0.85 cN, or at least 0.9 cN.

In embodiments of the disclosure, the ethylene interpolymer product has a melt strength stretch ratio of greater than 1200, or greater than 1300, or greater than 1400, or greater than 1500, or greater than 1600, or greater than 1700 or at least 1200, or at least 1300, or at least 1400, or at least 1500, or at least 1600, or at least 1700.

Dilution Index ($Y_d$) of Ethylene Interpolymer Products

The Dilution Index, $Y_d$ (having dimensions of degrees, °) of an ethylene interpolymer product as described herein, is defined in U.S. Pat. Appl. No. 2018/0298170 which is incorporated herein in its entirety.

A comparative polymer sample, "Comparative S" was used as the rheological reference in the Dilution Index test protocol. Comparative S is an ethylene interpolymer product including an ethylene interpolymer synthesized using an in-line Ziegler-Natta catalyst in one solution reactor, i.e. SCLAIR® FP120-C which is an ethylene/1-octene interpolymer available from NOVA Chemicals Company (Calgary, Alberta, Canada).

The following defines the Dilution Index ($Y_d$). In addition to having molecular weights, molecular weight distributions and branching structures, blends of ethylene interpolymers may exhibit a hierarchical structure in the melt phase. In other words, the ethylene interpolymer components may be, or may not be, homogeneous down to the molecular level depending on interpolymer miscibility and the physical history of the blend. Such hierarchical physical structure in the melt is expected to have a strong impact on flow and hence on processing and converting; as well as the end-use properties of manufactured articles. The nature of this hierarchical physical structure between interpolymers can be characterized.

Figure 4:
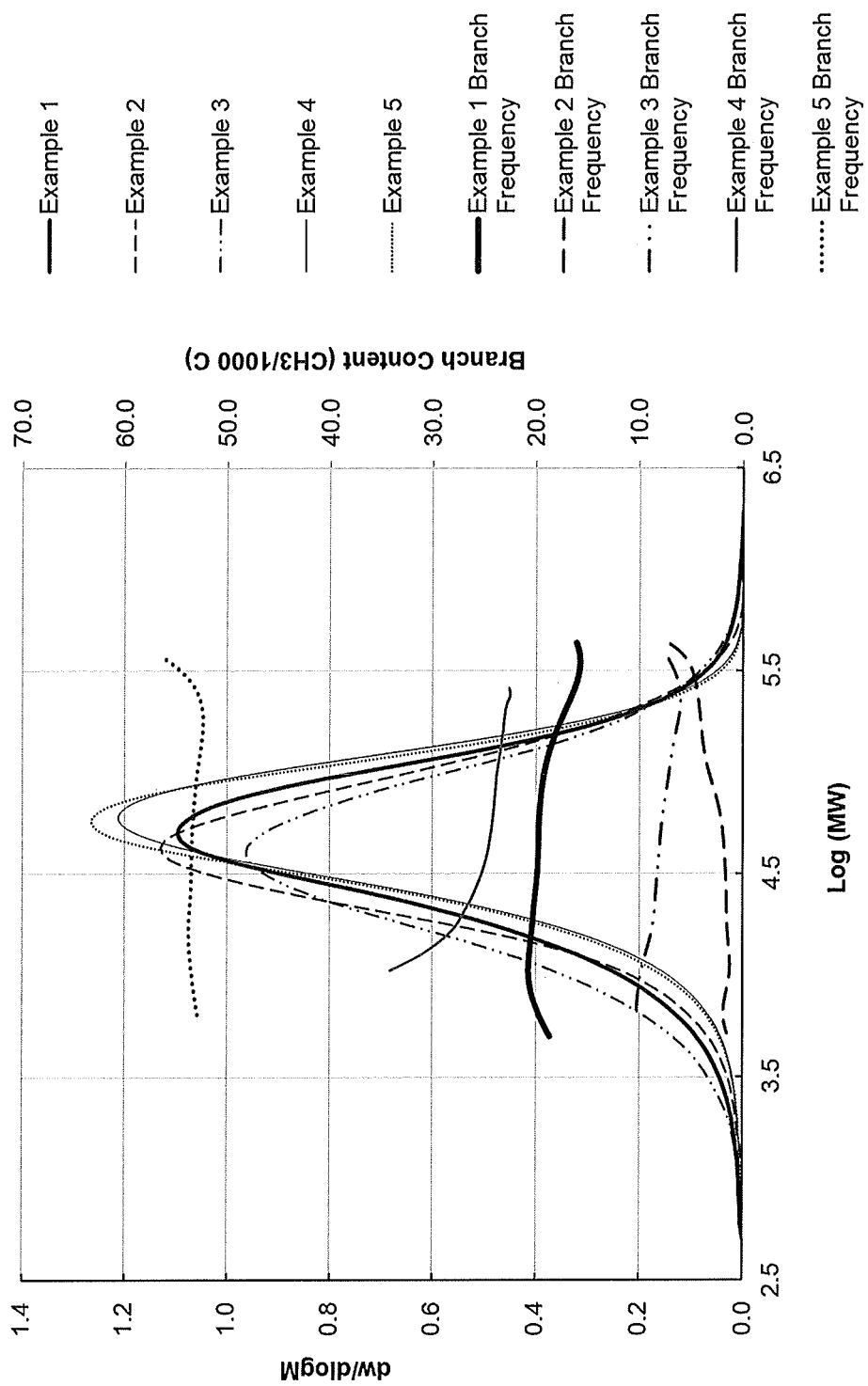
FIG. 4 shows the gel permeation chromatograph with Fourier transform infra-red (GPC-FTIR) detection obtained for an ethylene interpolymer product made according to the present disclosure as well as for various comparative resins. The comonomer content, shown as the number of short chain branches per 1000 backbone carbons (y-axis), is given relative to the copolymer molecular weight (x-axis). As can be seen in FIG. 4, for Example 1, the number of short chain branches is relatively constant with molecular weight, and hence the comonomer incorporation is said to be "flat" or "uniform".

The hierarchical physical structure of ethylene interpolymers can be characterized using melt rheology. A convenient method can be based on the small amplitude frequency sweep tests. Such rheology results are expressed as the phase angle δ as a function of complex modulus G*, referred to as van Gurp-Palmen plots (as described in M. Van Gurp, J. Palmen, Rheol. Bull. (1998) 67(1): 5-8, and; Dealy J, Plazek D. Rheol. Bull. (2009) 78(2): 16-31). For a typical ethylene interpolymer, the phase angle δ increases toward its upper bound of 90° with G* becoming sufficiently low. A typical VGP plot is shown in FIG. 4 of U.S. Pat. Appl. No. 2018/0298170 which is incorporated herein in its entirety. The VGP plots are a signature of resin architecture. The rise of δ toward 90° is monotonic for an ideally linear, monodisperse interpolymer. The δ (G*) for a branched interpolymer or a blend containing a branched interpolymer may show an inflection point that reflects the topology of the branched interpolymer (see S. Trinkle, P. Walter, C. Friedrich, Rheo. Acta (2002) 41: 103-113). The deviation of the phase angle δ from the monotonic rise may indicate a deviation from the ideal linear interpolymer either due to presence of long chain branching if the inflection point is low (e.g., δ≤20°) or a blend containing at least two interpolymers having dissimilar branching structure if the inflection point is high (e.g., δ≥70°).

Figure 5:
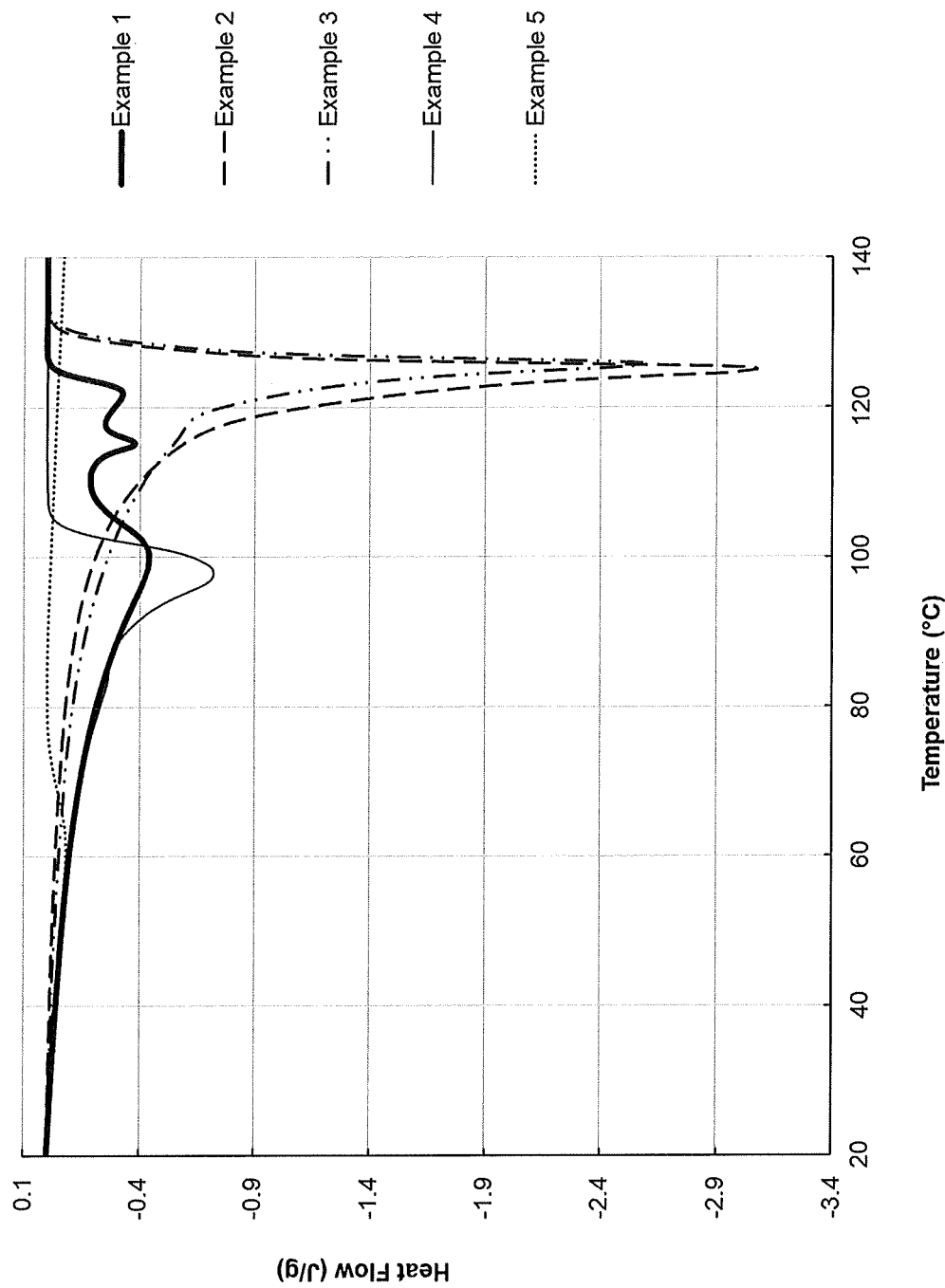
FIG. 5 shows the differential scanning calorimetry final heating curve for an ethylene interpolymer product made according to the present disclosure as well as for various comparative resins.

For commercially available linear low density polyethylenes, inflection points are not observed; with the exception of some commercial polyethylenes that contain a small amount of long chain branching (LCB). To use the VGP plots regardless of presence of LCB, an alternative is to use the point where the frequency $\omega_c$ is two decades below the cross-over frequency $\omega_x$, i.e., $\omega_c=0.01\omega_x$. The cross-over point is taken as the reference as it is known to be a characteristic point that correlates with MI, density and other specifications of an ethylene interpolymer. The cross-over modulus is related to the plateau modulus for a given molecular weight distribution (see S. Wu. J Polym Sci, Polym Phys Ed (1989) 27:723; M. R. Nobile, F. Cocchini. Rheol Acta (2001) 40:111). The two-decade shift in phase angle δ is to find the comparable points where the individual viscoelastic responses of constituents could be detected; to be more clear, this two decade shift is shown in FIG. 5 of U.S. Pat. Appl. No. 2018/0298170 which is incorporated herein in its entirety. The complex modulus for this point is normalized to the cross-over modulus, $G_x^*/(\sqrt{2})$, as ($\sqrt{2})G_c^*/G_x^*$, to minimize the variation due to overall molecular weight, molecular weight distribution and the short chain branching. As a result, the coordinates on VGP plots for this low frequency point at $\omega_c=0.01\omega_x$, namely ($\sqrt{2})G_c^*/G_x^*$ and $\delta_c$, characterize the contribution due to blending. Similar to the inflection points, the closer the (($\sqrt{2})G_c^*/G_x^*$, $\delta_c$) point is toward the 90° upper bound, the more the blend behaves as if it were an ideal single component.

As an alternative way to avoid interference due to the molecular weight, molecular weight distribution and the short branching of the ethylene $\delta_c$ interpolymer ingredients, the coordinates ($G_c^*$, $\delta_c$) are compared to a reference sample of interest to form the following two parameters:

$$Y_d = \delta_c - (C_0 - C_1 e^{C_2 \ln G_c^*}) \text{ "Dilution Index } (Y_d)\text{"}$$

$$X_d = \log_{10}(G_{0.01\omega_c}^*/G_r^*) \text{ "Dimensionless Modulus } (X_d)\text{"}$$

The constants $C_0$, $C_1$, and $C_2$ are determined by fitting the VGP data δ(G*) of the reference sample to the following equation:

$$\delta = C_0 - C_1 e^{C_2 \ln G^*}$$

where $G_r^*$ is the complex modulus of this reference sample at its $\delta_c = \delta(0.01\omega_x)$. When an ethylene interpolymer, synthesized with an in-line Ziegler-Natta catalyst employing one solution reactor, having a density of 0.920 g/cm$^3$ and a melt index (MI or $I_2$) of 1.0 dg/min is taken as a reference sample, the constants are:

$$C_0 = 93.43°$$

$$C_1 = 1.316°$$

$$C_2 = 0.2945$$

$$G_r^* = 9432 \text{ Pa.}$$

The values of these constants can be different if the rheology test protocol differs from that specified herein.

In the Dilution Index testing protocol, the upper limit on $Y_d$ may be about 20, in some cases about 15 and is other cases about 13. The lower limit on $Y_d$ may be about −30, in some cases −25, in other cases −20 and in still other cases −15.

In an embodiment of the disclosure, the ethylene interpolymer will have a Dilution Index, $Y_d$ of greater than zero (>0). In embodiments of the disclosure, the ethylene interpolymer will have a Dilution Index, $Y_d$ of from 1.0 to 10.0, or from 3.0 to 7.0, or from 4.0 to 6.5, or from 4.5 to 6.5, or from 4.5 to 6.0, or from 4.5 to 5.5.

Rotomolded Articles

There is a need to improve the balance of properties of rotomolded articles, including flexible or so called "soft touch" and "soft-touch feel" rotomolded articles. The ethylene interpolymer products disclosed herein are well suited to deliver this challenging combination of properties.

Typically, for use in a rotational molding process, the ethylene interpolymer product can be manufactured in powder or pellet form. The rotational molding process may additionally include process steps for manufacturing the ethylene interpolymer product. For rotational molding, in some embodiments, powders are preferably used having a particle size smaller than or equal to 35 US mesh. The grinding may be done cryogenically, if necessary. Thereafter, the powder is placed inside a hollow mold and then heated within the mold as the mold is rotated. The mold is usually rotated biaxially, i.e., rotated about two perpendicular axes simultaneously. The mold is typically heated externally (generally with a forced air circulating oven). The process steps include tumbling, heating and melting of thermoplastic powder, followed by coalescence, fusion or sintering and cooling to remove the molded article.

The ethylene interpolymer product of the present disclosure can be processed in most commercial rotational molding machines. The time and temperatures used will depend upon factors including the thickness of the part being rotomolded, and one skilled in the art can readily determine suitable processing conditions. By way of providing some non-limiting examples, the oven temperature range during the heating step may be from 400° F. to 800° F., or from about 500° F. to about 700° F., or from about 575° F. to about 650° F.

After the heating step the mold is cooled. The part is cooled enough to be easily removed from the mold and retain its shape. The mold may be removed from the oven while continuing to rotate. Cool air is first blown on the mold. The air may be an ambient temperature. After the air has started to cool the mold for a controlled time period, a water spray may be used. The water cools the mold more rapidly. The water used may be at cold tap water temperature, for example it may be from about 4° C. (40° F.) to about 16° C. (60° F.). After the water cooling step, another air cooling step may optionally be used. This may be a short step during which the equipment dries with heat removed during the evaporation of the water.

The heating and cooling cycle times will depend on the equipment used and the article being molded. Specific factors include the part thickness in the mold material. By way of providing a non-limiting example, conditions for an ⅛ inch thick part in a steel mold may be, to heat the mold in the oven with air at about 316° C. (600° F.) for about 15 minutes; the part may then be cooled in ambient temperature forced air for about 8 minutes and then a tap water spray at about 10° C. (50° F.) for about 5 minutes; optionally, the part may be cooled in ambient temperature forced air for an additional 2 minutes.

In some embodiments, during the heating and cooling steps the mold containing the molded article is preferably continually rotated. Typically, this is done along two perpendicular axes. The rate of rotation of the mold about each axis is limited by machine capability and the shape of the article being molded. A typical, non-limiting range of operations which may be used with the present disclosure is to have the ratio of rotation of the major axis to the minor axis of about 1:8 to 10:1 or from about 1:2 to 8:1.

Non-limiting examples of articles which can be made using a rotomolding process include seat cushions, arm rests, appliance handles, soft touch playground equipment, floats, fenders, buoys, furniture, marine buffers, automotive ducting, bins, automotive interior parts, children's toys, etc.

The desired physical properties of rotomolded articles depend on the application of interest. Non-limiting examples of desired properties include: flexural modulus (1% and 2% secant modulus); tensile toughness; environmental stress crack resistance (ESCR); shore hardness; heat deflection temperature (HDT); VICAT softening point; IZOD impact strength; ARM impact resistance; and color (whiteness and/or yellowness index).

In an embodiment of the disclosure, an ethylene interpolymer product having a melt index ($I_2$) of up to about 2 g/10 min is used to prepare very large rotomolded tanks (e.g. tanks having a volume in excess of 2000 liters). In such an embodiment, a very long molding time (in excess of 2 hours) may be used to prepare the parts.

In an embodiment of the disclosure, an ethylene interpolymer product having a having a melt index ($I_2$) of from about 5 g/10 min to about 8 g/10 min is used to prepare smaller rotomolded parts.

In an embodiment of the disclosure, an ethylene interpolymer product having a having a melt index ($I_2$) of from about 2.5 g/10 min to about 8 g/10 min is used to prepare smaller rotomolded parts.

As an alternative to rotomolding, the ethylene interpolymer products of the present disclosure may also be used to manufacture articles by compression molding or injection molding processes.

Additives and Adjuvants

The ethylene interpolymer products and the manufactured rotomolded articles described may optionally include, depending on its intended use, additives and adjuvants. Additives can be added to the ethylene interpolymer products during an extrusion or compounding step, but other suitable known methods will be apparent to a person skilled in the art. The additives can be added as is or as part of a separate polymer component added during an extrusion or compounding step. Non-limiting examples of additives and adjuvants include, anti-blocking agents, antioxidants, heat stabilizers, slip agents, processing aids, anti-static additives, colorants, dyes, filler materials, light stabilizers, heat stabilizers, light absorbers, lubricants, pigments, plasticizers, nucleating agents and combinations thereof. Non-limiting examples of suitable primary antioxidants include Irganox 1010 [CAS Reg. No. 6683-19-8] and Irganox 1076 [CAS Reg. No. 2082-79-3]; both available from BASF Corporation, Florham Park, N.J., U.S.A. Non-limiting examples of suitable secondary antioxidants include Irgafos 168 [CAS Reg. No. 31570-04-4], available from BASF Corporation, Florham Park, N.J., U.S.A.; Weston 705 [CAS Reg. No. 939402-02-5], available from Addivant, Danbury Conn., U.S.A. and; Doverphos Igp-11 [CAS Reg. No. 1227937-46-3] available form Dover Chemical Corporation, Dover Ohio, U.S.A. The additives that can be optionally added are typically added in amount of up to 20 weight percent (wt %).

One or more nucleating agent(s) may be introduced into the ethylene interpolymer product by kneading a mixture of the polymer, usually in powder or pellet form, with the nucleating agent, which may be utilized alone or in the form of a concentrate containing further additives such as stabilizers, pigments, antistatics, UV stabilizers and fillers. It should be a material which is wetted or absorbed by the polymer, which is insoluble in the polymer and of melting point higher than that of the polymer, and it should be homogeneously dispersible in the polymer melt in as fine a form as possible (1 to 10 µm). Compounds known to have a nucleating capacity for polyolefins include salts of aliphatic monobasic or dibasic acids or arylalkyl acids, such as sodium succinate or aluminum phenylacetate; and alkali metal or aluminum salts of aromatic or alicyclic carboxylic acids such as sodium β-naphthoate. Another compound known to have nucleating capacity is sodium benzoate. The effectiveness of nucleation may be monitored microscopically by observation of the degree of reduction in size of the spherulites into which the crystallites are aggregated. In embodiments of the disclosure, the ethylene interpolymer products and the manufactured rotomolded articles described may include additives selected from the group including antioxidants, phosphites and phosphonites, nitrones, antacids, UV light stabilizers, UV absorbers, metal deactivators, dyes, fillers and reinforcing agents, nano-scale organic or inorganic materials, antistatic agents, release agents such as zinc stearates, and nucleating agents (including nucleators, pigments or any other chemicals which may provide a nucleating effect to the polyethylene composition).

In embodiments of the disclosure, the additives that can be added are added in an amount of up to 20 weight percent (wt %).

Additives can be added to the ethylene interpolymer products during an extrusion or compounding step, but other suitable known methods will be apparent to a person skilled in the art. The additives can be added as is or as part of a separate polymer component added during an extrusion or compounding step.

A more detailed list of additives which may be added to ethylene interpolymer products of the present disclosure and which are used in rotomolded articles follows:
Phosphites (e.g. Aryl Monophosphite)
As used herein, the term aryl monophosphite refers to a phosphite stabilizer which contains: (1) only one phosphorus atom per molecule; and (2) at least one aryloxide (which may also be referred to as phenoxide) radical which is bonded to the phosphorus.

In an embodiment of the disclosure, aryl monophosphites contain three aryloxide radicals—for example, tris phenyl phosphite is the simplest member of this group of aryl monophosphites.

In another embodiment of the disclosure, aryl monophosphites contain $C_1$ to $C_{10}$ alkyl substituents on at least one of the aryloxide groups. These substituents may be linear (as in the case of nonyl substituents) or branched (such as isopropyl or tertiary butyl substituents).

Non-limiting examples of aryl monophosphites which may be used in embodiments of the disclosure, include those selected from triphenyl phosphite; diphenyl alkyl phosphites; phenyl dialkyl phosphites; tris(nonylphenyl) phosphite [WESTON 399, available from GE Specialty Chemicals]; tris(2,4-di-tert-butylphenyl) phosphite [IRGAFOS 168, available from Ciba Specialty Chemicals Corp.]; and bis(2,4-di-tert-butyl-6-methylphenyl) ethyl phosphite [IRGAFOS 38, available from Ciba Specialty Chemicals Corp.]; and 2,2',2"-nitrilo[triethyltris(3,3'5,5'-tetra-tert-butyl-1,1'-biphenyl-2,2'-diyl) phosphite [IRGAFOS 12, available from Ciba Specialty Chemicals Corp.].

In embodiments of the disclosure, the amount of aryl monophosphite added to the ethylene interpolymer product is added in from 200 to 2,000 ppm (based on the weight of the polymer), or from 300 to 1,500 ppm, or from 400 to 1,000 ppm.
Phosphites, Phosphonites (e.g. Diphosphite, Diphosphonite)
As used herein, the term diphosphite refers to a phosphite stabilizer which contains at least two phosphorus atoms per phosphite molecule (and, similarly, the term diphosphonite refers to a phosphonite stabilizer which contains at least two phosphorus atoms per phosphonite molecule).

Non-limiting examples of diphosphites and diphosphonites which may be used in embodiments of the disclosure include those selected from distearyl pentaerythritol diphosphite, diisodecyl pentaerythritol diphosphite, bis(2,4 di-tert-butylphenyl) pentaerythritol diphosphite [ULTRANOX 626, available from GE Specialty Chemicals]; bis(2,6-di-tert-butyl-4-methylpenyl) pentaerythritol diphosphite; bisisodecyloxy-pentaerythritol diphosphite, bis(2,4-di-tert-butyl-6-methylphenyl) pentaerythritol diphosphite, bis(2,4,6-tri-tert-butylphenyl) pentaerythritol diphosphite, tetrakis(2,4-di-tert-butylphenyl)4,4'-bipheylene-diphosphonite [IRGAFOS P-EPQ, available from Ciba] and bis(2,4-dicumylphenyl)pentaerythritol diphosphite [DOVERPHOS S9228-T or DOVERPHOS S9228-CT] and PEPQ (CAS No 119345-01-06), which is an example of a commercially available diphosphonite.

In embodiments of the disclosure, the diphosphite and/or diphosphonite added to the ethylene interpolymer product is added in from 200 ppm to 2,000 ppm (based on the weight of the polymer), or from 300 to 1,500 ppm, or from 400 to 1,000 ppm.

In an embodiment of the disclosure, the use of diphosphites is preferred over the use of diphosphonites.

In an embodiment of the disclosure, the most preferred diphosphites are those available under the trademarks DOVERPHOS S9228-CT and ULTRANOX 626.
Hindered Phenolic Antioxidant
The hindered phenolic antioxidant may be any of the molecules that are conventionally used as primary antioxidants for the stabilization of polyolefins. Suitable examples include 2,6-di-tert-butyl-4-methylphenol; 2-tert-butyl-4,6-dimethylphenol; 2,6-di-tert-butyl-4-ethylphenol; 2,6-di-tertbutyl-4-n-butylphenol; 2,6-di-tert-butyl-4isobutylphenol; 2,6-dicyclopentyl-4-methylphenol; 2-(.alpha.-methylcyclohexyl)-4,6 dimethylphenol; 2,6-di-octadecyl-4-methylphenol; 2,4,6-tricyclohexyphenol; and 2,6-di-tert-butyl-4-methoxymethylphenol.

Two (non limiting) examples of suitable hindered phenolic antioxidants which can be used in embodiments of the disclosure, are sold under the trademarks IRGANOX™ 1010 (CAS Registry number 6683-19-8) and IRGANOX™ 1076 (CAS Registry number 2082-79-3) by BASF Corporation.

In an embodiment of the disclosure, the amount of hindered phenolic antioxidant added to the ethylene interpolymer product is added in from 100 to 2000 ppm, or from 400 to 1000 ppm (based on the weight of said thermoplastic polyethylene product).

Long Term Stabilizers

Plastic parts which are intended for long term use, can in embodiments of the present disclosure, contain at least one Hindered Amine Light Stabilizer (HALS). HALS are well known to those skilled in the art.

When employed, the HALS may in an embodiment of the disclosure be a commercially available material and may be used in a conventional manner and in a conventional amount.

Commercially available HALS which may be used in embodiments of the disclosure include those sold under the trademarks CHIMASSORB™ 119; CHIMASSORB 944; CHIMASSORB 2020; TINUVIN™ 622 and TINUVIN 770 from Ciba Specialty Chemicals Corporation, and CYASORB™ UV 3346, CYASORB UV 3529, CYASORB UV 4801, and CYASORB UV 4802 from Cytec Industries. In some embodiments of the disclosure, TINUVIN 622 is preferred. In other embodiments of the disclosure, the use of mixtures of more than one HALS are also contemplated.

In embodiments of the disclosure, suitable HALS include those selected from bis(2,2,6,6-tetramethylpiperidyl)-sebacate; bis-5(1,2,2,6,6-pentamethylpiperidyl)-sebacate; n-butyl-3,5-di-tert-butyl-4-hydroxybenzyl malonic acid bis (1,2,2,6,6-pentamethylpiperidyl)ester; condensation product of 1-hydroxyethyl-2,2,6,6-tetramethyl-4-hydroxy-piperidine and succinic acid; condensation product of N,N'-(2,2,6,6-tetramethylpiperidyl)-hexamethylendiamine and 4-tert-octylamino-2,6-dichloro-1,3,5-s-triazine; tris-(2,2,6,6-tetramethylpiperidyl)-nitrilotriacetate, tetrakis-(2,2,6,6-tetramethyl-4-piperidyl)-1,2,3,4butane-tetra-arbonic acid; and 1,1'(1,2-ethanediyl)-bis-(3,3,5,5-tetramethylpiperazinone).

Hydroxylamines

It is known to use hydroxylamines and derivatives thereof (including amine oxides) as additives for polyethylene compositions used to prepare rotomolded parts, as disclosed in for example U.S. Pat. No. 6,444,733 and in embodiments of the present disclosure, the hydroxylamines and derivatives disclosed in this patent may also be suitable for use.

In an embodiment of the disclosure, a useful hydroxylamine for inclusion in the ethylene interpolymer product can be selected from N,N-dialkylhydroxylamines, a commercially available example of which is the N,N-di(alkyl) hydroxylamine sold as IRGASTAB 042 (by BASF) and which is reported to be prepared by the direct oxidation of N,N di (hydrogenated) tallow amine.

In an embodiment of the disclosure, the ethylene interpolymer product contains an additive package including: a hindered monophosphite; a diphosphite; a hindered amine light stabilizer, and at least one additional additive chosen from a hindered phenol and a hydroxylamine.

Further non-limiting details of the disclosure are provided in the following examples. The examples are presented for the purposes of illustrating selected embodiments of this disclosure, it being understood that the examples presented do not limit the claims presented.

EXAMPLES

Prior to testing, each specimen was conditioned for at least 24 hours at 23±2° C. and 50±10% relative humidity and subsequent testing was conducted at 23±2° C. and 50±10% relative humidity. Herein, the term "ASTM conditions" refers to a laboratory that is maintained at 23±2° C. and 50±10% relative humidity; and specimens to be tested were conditioned for at least 24 hours in this laboratory prior to testing. ASTM refers to the American Society for Testing and Materials.

Density

Ethylene interpolymer product densities were determined using ASTM D792-13 (Nov. 1, 2013).

Melt Index

Ethylene interpolymer product melt index was determined using ASTM D1238 (Aug. 1, 2013). Melt indexes, $I_2$, $I_6$, $I_{10}$ and $I_{21}$ were measured at 190° C., using weights of 2.16 kg, 6.48 kg, 10 kg and a 21.6 kg respectively. Herein, the term "stress exponent" or its acronym "S.Ex.", is defined by the following relationship:

$$S.Ex.=\log(I_6/I_2)/\log(6480/2160)$$

wherein $I_6$ and $I_2$ are the melt flow rates measured at 190° C. using 6.48 kg and 2.16 kg loads, respectively. In this disclosure, melt index was expressed using the units of g/10 minutes or g/10 min or dg/minutes or dg/min; these units are equivalent.

Gel Permeation Chromatography (GPC

Ethylene interpolymer product molecular weights, $M_n$, $M_w$ and $M_z$, as well the as the polydispersity ($M_w/M_n$), were determined using ASTM D6474-12 (Dec. 15, 2012). Ethylene interpolymer product sample solutions (1 to 2 mg/mL) were prepared by heating the interpolymer in 1,2,4-trichlorobenzene (TCB) and rotating on a wheel for 4 hours at 150° C. in an oven. The antioxidant 2,6-di-tert-butyl-4-methylphenol (BHT) was added to the mixture in order to stabilize the interpolymer against oxidative degradation. The BHT concentration was 250 ppm. Sample solutions were chromatographed at 140° C. on a PL 220 high-temperature chromatography unit equipped with four Shodex columns (HT803, HT804, HT805 and HT806) using TCB as the mobile phase with a flow rate of 1.0 mL/minute, with a differential refractive index (DRI) as the concentration detector. BHT was added to the mobile phase at a concentration of 250 ppm to protect GPC columns from oxidative degradation. The sample injection volume was 200 µL. The GPC raw data were processed with the Cirrus GPC software. The GPC columns were calibrated with narrow distribution polystyrene standards. The polystyrene molecular weights were converted to polyethylene molecular weights using the Mark-Houwink equation, as described in ASTM D6474-12 (Dec. 15, 2012).

GPC-FTIR

Ethylene copolymer composition (polymer) solutions (2 to 4 mg/mL) were prepared by heating the polymer in 1,2,4-trichlorobenzene (TCB) and rotating on a wheel for 4 hours at 150° C. in an oven. The antioxidant 2,6-di-tert-butyl-4-methylphenol (BHT) was added to the mixture in order to stabilize the polymer against oxidative degradation. The BHT concentration was 250 ppm. Sample solutions were chromatographed at 140° C. on a Waters GPC 150C chromatography unit equipped with four Shodex columns (HT803, HT804, HT805 and HT806) using TCB as the mobile phase with a flow rate of 1.0 mL/minute, with a FTIR spectrometer and a heated FTIR flow through cell coupled with the chromatography unit through a heated transfer line as the detection system. BHT was added to the mobile phase at a concentration of 250 ppm to protect SEC columns from oxidative degradation. The sample injection volume was 300 μL. The raw FTIR spectra were processed with OPUS FTIR software and the polymer concentration and methyl content were calculated in real time with the Chemometric Software (PLS technique) associated with the OPUS. Then the polymer concentration and methyl content were acquired and baseline-corrected with the Cirrus GPC software. The SEC columns were calibrated with narrow distribution polystyrene standards. The polystyrene molecular weights were converted to polyethylene molecular weights using the Mark-Houwink equation, as described in the ASTM standard test method D6474. The comonomer content was calculated based on the polymer concentration and methyl content predicted by the PLS technique as described in Paul J. DesLauriers, Polymer 43, pages 159-170 (2002); herein incorporated by reference.

The GPC-FTIR method measures total methyl content, which includes the methyl groups located at the ends of each macromolecular chain, i.e. methyl end groups. Thus, the raw GPC-FTIR data is corrected by subtracting the contribution from methyl end groups. To be more clear, the raw GPC-FTIR data overestimates the amount of short chain branching (SCB) and this overestimation increases as molecular weight (M) decreases. In this disclosure, raw GPC-FTIR data was corrected using the 2-methyl correction. At a given molecular weight (M), the number of methyl end groups ($N_E$) was calculated using the following equation; $N_E=28000/M$, and $N_E$ (M dependent) was subtracted from the raw GPC-FTIR data to produce the SCB/1000C (2-Methyl Corrected) GPC-FTIR data.

Unsaturation Content

The quantity of unsaturated groups, i.e., double bonds, in an ethylene interpolymer product was determined according to ASTM D3124-98 (vinylidene unsaturation, published March 2011) and ASTM D6248-98 (vinyl and trans unsaturation, published July 2012). An ethylene interpolymer sample was: a) first subjected to a carbon disulfide extraction to remove additives that may interfere with the analysis; b) the sample (pellet, film or granular form) was pressed into a plaque of uniform thickness (0.5 mm), and; c) the plaque was analyzed by FTIR.

Comonomer Content: Fourier Transform Infrared (FTIR) Spectroscopy

The quantity of comonomer in an ethylene copolymer composition was determined by FTIR and reported as the Short Chain Branching (SCB) content having dimensions of $CH_3\#/1000C$ (number of methyl branches per 1000 carbon atoms). This test was completed according to ASTM D6645-01 (2001), employing a compression molded polymer plaque and a Thermo-Nicolet 750 Magna-IR Spectrophotometer. The polymer plaque was prepared using a compression molding device (Wabash-Genesis Series press) according to ASTM D4703-16 (April 2016).

Composition Distribution Branching Index (CDBI

The "Composition Distribution Branching Index" or "CDBI" of the disclosed Examples and Comparative Examples were determined using a crystal-TREF unit commercially available form Polymer ChAR (Valencia, Spain). The acronym "TREF" refers to Temperature Rising Elution Fractionation. A sample of ethylene interpolymer product (80 to 100 mg) was placed in the reactor of the Polymer ChAR crystal-TREF unit, the reactor was filled with 35 ml of 1,2,4-trichlorobenzene (TCB), heated to 150° C. and held at this temperature for 2 hours to dissolve the sample. An aliquot of the TCB solution (1.5 mL) was then loaded into the Polymer ChAR TREF column filled with stainless steel beads and the column was equilibrated for 45 minutes at 110° C. The ethylene interpolymer product was then crystallized from the TCB solution, in the TREF column, by slowly cooling the column from 110° C. to 30° C. using a cooling rate of 0.09° C. per minute. The TREF column was then equilibrated at 30° C. for 30 minutes. The crystallized ethylene interpolymer product was then eluted from the TREF column by passing pure TCB solvent through the column at a flow rate of 0.75 mL/minute as the temperature of the column was slowly increased from 30° C. to 120° C. using a heating rate of 0.25° C. per minute. Using Polymer ChAR software a TREF distribution curve was generated as the ethylene interpolymer product was eluted from the TREF column, i.e., a TREF distribution curve is a plot of the quantity (or intensity) of ethylene interpolymer eluting from the column as a function of TREF elution temperature. A $CDBI_{50}$ was calculated from the TREF distribution curve for each ethylene interpolymer product analyzed. The "$CDBI_{50}$" is defined as the percent of ethylene interpolymer whose composition is within 50% of the median comonomer composition (25% on each side of the median comonomer composition); it is calculated from the TREF composition distribution curve and the normalized cumulative integral of the TREF composition distribution curve. Those skilled in the art will understand that a calibration curve is required to convert a TREF elution temperature to comonomer content, i.e., the amount of comonomer in the ethylene interpolymer fraction that elutes at a specific temperature. The generation of such calibration curves are described in the prior art, e.g., Wild, et al., J. Polym. Sci., Part B, Polym. Phys., Vol. 20 (3), pages 441-455: hereby fully incorporated by reference.

Neutron Activation Analysis (NAA

Neutron Activation Analysis, hereafter NAA, was used to determine catalyst residues in ethylene interpolymers and was performed as follows. A radiation vial (composed of ultrapure polyethylene, 7 mL internal volume) was filled with an ethylene interpolymer product sample and the sample weight was recorded. Using a pneumatic transfer system the sample was placed inside a SLOWPOKE™ nuclear reactor (Atomic Energy of Canada Limited, Ottawa, Ontario, Canada) and irradiated for 30 to 600 seconds for short half-life elements (e.g., Ti, V, Al, Mg, and Cl) or 3 to 5 hours for long half-life elements (e.g., Zr, Hf, Cr, Fe and Ni). The average thermal neutron flux within the reactor was $5 \times 10^{11}/cm^2/s$. After irradiation, samples were withdrawn from the reactor and aged, allowing the radioactivity to decay; short half-life elements were aged for 300 seconds or long half-life elements were aged for several days. After aging, the gamma-ray spectrum of the sample was recorded using a germanium semiconductor gamma-ray detector (Ortec model GEM55185, Advanced Measurement Technology Inc., Oak Ridge, Tenn., USA) and a multichannel analyzer (Ortec model DSPEC Pro). The amount of each element in the sample was calculated from the gamma-ray spectrum and recorded in parts per million relative to the total weight of the ethylene interpolymer sample. The N.A.A. system was calibrated with Specpure standards (1000 ppm solutions of the desired element (greater than 99% pure)). One mL of solutions (elements of interest) were pipetted onto a 15 mm×800 mm rectangular paper filter and air dried. The filter paper was then placed in a 1.4 mL polyethylene irradiation vial and analyzed by the N.A.A. system. Standards are used to determine the sensitivity of the N.A.A. procedure (in counts/µg).

Dilution Index ($Y_d$) Measurements

A series of small amplitude frequency sweep tests were run on each sample using an Anton Paar MCR501 Rotational Rheometer equipped with the "TruGap™ Parallel Plate measuring system". A gap of 1.5 mm and a strain amplitude of 10% were used throughout the tests. The frequency sweeps were from 0.05 to 100 rad/s at the intervals of seven points per decade. The test temperatures were 170°, 190°, 210° and 230° C. Master curves at 190° C. were constructed for each sample using the Rheoplus/32 V3.40 software through the Standard TTS (time-temperature superposition) procedure, with both horizontal and vertical shift enabled.

In some cases, dynamic mechanical analysis was carried out only at 190° C. and the dynamic moduli crossover point occurred at frequencies outside the experimental range used to generate the data points. The crossover frequency was estimated by extrapolating the G' and G" curves, as a function of frequency, on a logarithmic scale, using a 33-mode generalized Maxwell model as described in Rheologica Acta 28.6 (1989): 511-519. For such cases, a sensitivity analysis was carried out to estimate the propagated uncertainty in the evaluation of the dilution index Yd. The sensitivity analysis consisted in generating 100 random sample numbers within 10%, 25% and 50% of the extrapolated crossover frequency.

Tensile Properties

The following tensile properties were determined using ASTM D 638: elongation at yield (%), yield strength (MPa), ultimate elongation (%), ultimate strength (MPa) and 1 and 2% secant modulus (MPa).

Flexural Properties

Flexural properties, i.e., 2% flexural secant modulus was determined using ASTM D790-10 (published in April 2010).

Hexane Extractables

Hexane extractables was determined according to the Code of Federal Registration 21 CFR § 177.1520 Para (c) 3.1 and 3.2; wherein the quantity of hexane extractable material in a sample is determined gravimetrically.

Differential Scanning Calorimetry (DSC

Primary melting peak (° C.), melting peak temperatures (° C.), heat of fusion (J/g) and crystallinity (%) was determined using differential scanning calorimetry (DSC) as follows: the instrument was first calibrated with indium; after the calibration, a polymer specimen is equilibrated at 0° C. and then the temperature was increased to 200° C. at a heating rate of 10° C./min; the melt was then kept isothermally at 200° C. for five minutes; the melt was then cooled to 0° C. at a cooling rate of 10° C./min and kept at 0° C. for five minutes; the specimen was then heated to 200° C. at a heating rate of 10° C./min. The DSC Tm, heat of fusion and crystallinity are reported from the $2^{nd}$ heating cycle.

Vicat Softening Point (Temperature

The Vicat softening point of an ethylene interpolymer product was determined according to ASTM D1525-07 (published December 2009). This test determines the temperature at which a specified needle penetration occurs when samples are subjected to ASTM D1525-07 test conditions, i.e., heating Rate B (120±10° C./hr and 938 gram load (10±0.2N load).

Dynamic Mechanical Analysis (DMA

Oscillatory shear measurements under small strain amplitudes were carried out to obtain linear viscoelastic functions at 190° C. under $N_2$ atmosphere, at a strain amplitude of 10% and over a frequency range of 0.02-126 rad/s at 5 points per decade. Frequency sweep experiments were performed with a TA Instruments DHR3 stress-controlled rheometer using cone-plate geometry with a cone angle of 5°, a truncation of 137 µm and a diameter of 25 mm. In this experiment a sinusoidal strain wave was applied and the stress response was analyzed in terms of linear viscoelastic functions. The zero shear rate viscosity ($\eta_0$) based on the DMA frequency sweep results was predicted by Ellis model (see R. B. Bird et al. "Dynamics of Polymer Liquids. Volume 1: Fluid Mechanics" Wiley-Interscience Publications (1987) p. 228) or Carreau-Yasuda model (see K. Yasuda (1979) PhD Thesis, IT Cambridge). The dynamic rheological data were analyzed using the rheometer software (viz., Rheometrics RHIOS V4.4 or Orchestrator Software) to determine the melt elastic modulus G'(G"=500) at a reference melt viscous modulus (G") value of G"=500 Pa. If necessary, the values were obtained by interpolation between the available data points using the Rheometrics software. The term "Storage modulus", G'(co), also known as "elastic modulus", which is a function of the applied oscillating frequency, co, is defined as the stress in phase with the strain in a sinusoidal deformation divided by the strain; while the term "Viscous modulus", G"(ω), also known as "loss modulus", which is also a function of the applied oscillating frequency, w, is defined as the stress 90 degrees out of phase with the strain divided by the strain. Both these moduli, and the others linear viscoelastic, dynamic rheological parameters, are well known within the skill in the art, for example, as discussed by G. Marin in "Oscillatory Rheometry", Chapter 10 of the book on Rheological Measurement, edited by A. A. Collyer and D. W. Clegg, Elsevier, 1988.

The evaluation of relative elasticity is based on measurements carried out at low frequencies, which are most relevant for conditions associated with powder sintering and densification in rotomolding. The relative elasticity is evaluated based on the ratio of G' over G" at a frequency of 0.05 rad/s from DMA frequency sweep measurements carried out at 190° C. Data reported in the literature show that resin compositions with a high relative elasticity tend to exhibit processing difficulties in terms of slow powder densification.

Wang and Kontopoulou (2004) reported adequate rotomoldability for blend compositions that were characterized with a relative elasticity as high as 0.125. In that study, the effect of plastomer content on the rotomoldability of polypropylene was investigated (W. Q. Wang and M. Kontopoulou (2004) Polymer Engineering and Science, vo. 44, no 9, pp 1662-1669). Further analysis of the results published by Wang and Kontopoulou show that compositions with higher plastomer content exhibited increasing relative elasticity (G'/G">0.13) and correspondingly increasing difficulties in achieving full densification during rotomolding evaluation.

Melt Strength

The melt strength is measured on Rosand RH-7 capillary rheometer (barrel diameter=15 mm) with a flat die of 2-mm Diameter, L/D ratio 10:1 at 190° C. Pressure Transducer: 10,000 psi (68.95 MPa). Piston Speed: 5.33 mm/min. Haul-off Angle: 52°. Haul-off incremental speed: 50-80 m/min$^2$ or 65±15 m/min$^2$. A polymer melt is extruded through a capillary die under a constant rate and then the polymer strand is drawn at an increasing haul-off speed until it ruptures. The maximum steady value of the force in the plateau region of a force versus time curve is defined as the melt strength for the polymer. The melt strength stretch ratio is defined as the ratio of the velocity at pulley over the velocity at the exit of the die.

Shore Hardness

Shore D Hardness was determined according to ASTM D2240 using a Rex D Durometer or Fowler Shore D Durometer.

Preparation of Ethylene Interpolymer Products

Ethylene interpolymer products were produced in a continuous solution polymerization pilot plant including reactors arranged in a series configuration. Methylpentane was used as the process solvent (a commercial blend of methylpentane isomers). The volume of the first CSTR reactor (R1) was 3.2 gallons (12 L), the volume of the second CSTR reactor (R2) was 5.8 gallons (22 L) and the volume of the tubular reactor (R3) was 4.8 gallons (18 L). Examples of ethylene interpolymer products were produced using an R1 pressure from about 14 MPa to about 18 MPa; R2 was operated at a lower pressure to facilitate continuous flow from R1 to R2. R1 and R2 were operated in series mode, wherein the first exit stream from R1 flows directly into R2. Both CSTR's were agitated to give conditions in which the reactor contents were well mixed. The process was operated continuously by feeding fresh process solvent, ethylene, 1-octene and hydrogen to the reactors.

The single site catalyst components used were: component (i), cyclopentadienyltri(tertiarybutyl)phosphinimine titanium dichloride, (Cp[(t-Bu)$_3$PN]TiCl$_2$), hereafter PIC-1; component (ii), methylaluminoxane (MAO-07); component (iii), trityl tetrakis(pentafluoro-phenyl)borate, and; component (iv), 2,6-di-tert-butyl-4-ethylphenol. The single site catalyst component solvents used were methylpentane for components (ii) and (iv) and xylene for components (i) and (iii). The quantity of PIC-1 added to R1, "R1 (i) (ppm)" is shown in Table 1; to be clear, in Example A1 in Table 1, the solution in R1 contained 0.23 ppm of component (i), i.e. PIC-1. The mole ratios of the single site catalyst components employed to produce Example A1 were: R1 (ii)/(i) mole ratio=100, i.e. [(MAO-07)/(PIC-1)]; R1 (iv)/(ii) mole ratio=0.0, i.e. [(2,6-di-tert-butyl-4-ethylphenol)/(MAO-07)], and; R1 (iii)/(i) mole ratio=1.1, i.e. [(trityl tetrakis(pentafluoro-phenyl)borate)/(PIC-1)].

The in-line Ziegler-Natta catalyst formulation was prepared from the following components: component (v), butyl ethyl magnesium; component (vi), tertiary butyl chloride; component (vii), titanium tetrachloride; component (viii), diethyl aluminum ethoxide, and; component (ix), triethyl aluminum. Methylpentane was used as the catalyst component solvent. The in-line Ziegler-Natta catalyst formulation was prepared using the following steps. In step one, a solution of triethylaluminum and dibutylmagnesium ((triethylaluminum)/(dibutylmagnesium) molar ratio of 20) was combined with a solution of tertiary butyl chloride and allowed to react for about 30 seconds (HUT-1); in step two, a solution of titanium tetrachloride was added to the mixture formed in step one and allowed to react for about 14 seconds (HUT-2), and; in step three, the mixture formed in step two was allowed to reactor for an additional 3 seconds (HUT-3) prior to injection into R2. The in-line Ziegler-Natta procatalyst formulation was injected into R2 using process solvent, the flow rate of the catalyst containing solvent was about 49 kg/hr. The in-line Ziegler-Natta catalyst formulation was formed in R2 by injecting a solution of diethyl aluminum ethoxide into R2. The quantity of titanium tetrachloride "R2 (vii) (ppm)" added to reactor 2 (R2) is shown in Table 1A; to be clear in Example A1 the solution in R2 contained 6.71 ppm of TiCl$_4$.

Average residence time of the solvent in a reactor is primarily influenced by the amount of solvent flowing through each reactor and the total amount of solvent flowing through the solution process, the following are representative or typical values for the examples shown in Table 1A: average reactor residence times were: about 61 seconds in R1, about 73 seconds in R2 and about 50 seconds in R3 (the volume of R3 was about 4.8 gallons (18 L)).

Polymerization in the continuous solution polymerization process was terminated by adding a catalyst deactivator to the third exit stream exiting the tubular reactor (R3). The catalyst deactivator used was octanoic acid (caprylic acid), commercially available from P&G Chemicals, Cincinnati, Ohio, U.S.A. The catalyst deactivator was added such that the moles of fatty acid added were 50% of the total molar amount of titanium and aluminum added to the polymerization process; to be clear, the moles of octanoic acid added=0.5×(moles titanium+moles aluminum); this mole ratio was consistently used in all examples.

A two-stage devolatilization process was employed to recover the ethylene interpolymer product from the process solvent, i.e. two vapor/liquid separators were used and the second bottom stream (from the second V/L separator) was passed through a gear pump/pelletizer combination. DHT-4V (hydrotalcite), supplied by Kyowa Chemical Industry Co. LTD, Tokyo, Japan was used as a passivator, or acid scavenger, in the continuous solution process. A slurry of DHT-4V in process solvent was added prior to the first V/L separator. The molar amount of DHT-4V added was about 10-fold higher than the molar amount of chlorides added to the process; the chlorides added were titanium tetrachloride and tertiary butyl chloride.

Prior to pelletization the ethylene interpolymer product was stabilized by adding about 500 ppm of Irganox 1076 (a primary antioxidant) and about 500 ppm of Irgafos 168 (a secondary antioxidant), based on weight of the ethylene interpolymer product. Antioxidants were dissolved in process solvent and added between the first and second V/L separators.

Polymerization process conditions are given in Table 1A.

TABLE 1A

Polymerization Process Conditions

| Process Parameter | Example A1 |
|---|---|
| R1 Catalyst | PIC-1 |
| R2 Catalyst | Ziegler-Natta |
| R1 (i) (ppm) | 0.23 |
| R1 (ii) /(i) mole ratio | 100.06 |
| R1 (iv) /(ii) mole ratio | 0.04 |
| R1 (iii) /(i) mole ratio | 1.10 |
| R2 (vii) (ppm) | 6.71 |
| R2 (vi)/(v) mole ratio | 1.52 |
| R2 (viii)/(vii) mole ratio | 1.35 |
| R2 (ix)/(vii) mole ratio | 0.35 |
| $ES^{R1}$ | 45 |
| $ES^{R2}$ | 55 |
| $ES^{R3}$ | 0 |
| Ethylene concentration (wt %) in R1 | 9.90 |
| Ethylene concentration (wt %) in R2 | 23.1 |
| Ethylene concentration (wt %) overall | 12.9 |
| Ethylene concentration (wt %) in R3 | NA |
| O/E | 0.63 |
| $OS^{R1}$ (%) | 92 |
| $OS^{R2}$ (%) | 8 |
| $OS^{R3}$ (%) | NA |
| $H_2^{R1}$ (ppm) | 1.2 |
| $H_2^{R2}$ (ppm) | 4.9 |
| $H_2^{R3}$ (ppm) | NA |
| Polymer Prod. Rate (kg/h) | 78.8 |
| R1 total solution rate (kg/h) | 351.8 |
| R2 total solution rate (kg/h) | 248.2 |
| Total solution rate (kg/h) | 600.0 |
| R1 inlet temp (° C.) | 35.0 |
| R2 inlet temp (° C.) | 35.0 |
| R3 inlet temp (° C.) | NA |
| R1 Mean temp (° C.) | 154.1 |
| R2 Mean temp (° C.) | 194.3 |
| R3 exit temp (° C.) | 193.1 |
| $Q^{R1}$ (%) | 88.0 |
| $Q^{R2}$ (%) | 84.1 |
| $Q^{R3}$ (%) | 16.0 |
| $Q^{Total}$ (%) | 91.9 |
| Density | 0.9130 |
| Melt index, $I_2$ | 3.8 |
| S. Ex | 1.19 |
| MFR | 20.5 |
| Mw/Mn | 2.6 |
| Mw | 73,744 |

TSR = total flow rate (kg/hr) of solvent + ethylene + octene
$ES^{R1}$ = % of total ethylene added to first reactor
$ES^{R2}$ = % of total ethylene added to second reactor
$ES^{R3}$ = % of total ethylene added to third reactor
O/E = total octene/ethylene weight ratio
$OS^{R1}$ = weight % of total octene added to first reactor
$OS^{R2}$ = weight % of total octene added to second reactor
$Q^{R1}$ = % ethylene in R1 converted to polymer
$Q^{R2}$ = % of ethylene in R2 converted to polymer
$Q^{Total}$ (%) = % of ethylene converted overall
Polymer production rate (kg/hr) is total polymer produced
MI = melt index, "$I_2$" (dg/min)
S. Ex = stress exponent
MFR = $I_{21}/I_2$ In addition, a computer generated version of an ethylene interpolymer product is illustrated in Table 1B (using methods substantially as described in U.S. Pat. No. 9,695,309) in order to estimate the properties of the first and second ethylene interpolymers made in each of the first (R1) and the second (R2) polymerization reactors. This simulation was based on fundamental kinetic models (with kinetic constants specific for each catalyst formulation) as well as the feed and reactor conditions presented in Table 1 and used for the production of Example A1. The simulation was further based on the configuration of the solution pilot plant described above which was used to produce the ethylene interpolymer product of Example A1. A simulated version of Example A1 was synthesized using a single-site catalyst formulation (PIC-1) in R1 and an in-line Ziegler-Natta catalyst formulation in R2. As shown Table 1B, the simulated version of Example A1 has a density of 0.9142 g/cm³, a melt index of 2.9 dg/min, a branch frequency of 14.1 (the number of C6-branches per 1000 carbon atoms (1-octene comonomer)) and a $M_w/M_n$ of 2.9. Table 1B also shows the estimated weight fraction, branch frequency, density, melt index ($I_2$) and molecular weights (Mw, Mn, and Mz) of the first and second ethylene interpolymers produced in the two reactors (i.e. in R1 and R2). These are these two interpolymers which are combined to produce a simulated version of Example A1 (the ethylene polymer product). Simulated Example A1 includes: a first and second ethylene interpolymer having a first and second melt index of 2.1 dg/min and 3.6 dg/min, respectively; a first and second density of 0.9064 g/cm³ and 0.9209 g/cm³, respectively; and a first and second $M_w/M_n$ of 2.0 and 3.1, respectively.

Graphically, a deconvolutjon of the gel permeation chromatograph of Example A1 can be seen in FIG. 1B.

TABLE 1B

Computer Generated Simulated Example A1: Single-Site Catalyst Formulation in R1 (PIC-1) and In-Line Ziegler-Natta Catalyst Formulation in R2

| Simulated Physical Property | Reactor 1 (R1) First Ethylene Interpolymer | Reactor 2 (R2) Second Ethylene Interpolymer | Simulated Example A1 |
|---|---|---|---|
| Weight percent (%) | 45 | 55 | 100 |
| $M_n$ | 42,086 | 24,240 | 29,204 |
| $M_w$ | 85,028 | 75,886 | 78,229 |
| $M_z$ | 129,819 | 187,596 | 164,517 |
| Polydispersity ($M_w/M_n$) | 2.0 | 3.1 | 2.7 |
| Branch Frequency ($C_6$ Branches per 1000 C.) | 16.4 | 11.5 | 14.1 |
| Density (g/cm³) | 0.9064 | 0.9209 | 0.9142 |
| Melt Index $I_2$ (dg/min) | 2.1 | 3.6 | 2.9 |

The properties of ethylene interpolymer products produced according to the present disclosure, Example A1 and Example 1 are provided in Table 2. Example A1 was manufactured at the pilot plant scale as described above. Example 1 was manufactured similarly to Example A1 but at the commercial scale. Hence, Example A1 and Example 1 represent two versions of the same targeted ethylene interpolymer product, with each being manufactured at a different scale of operation. Table 2 also includes data for several comparative polyethylene resins, Examples 2-8. Example 2 is Surpass® RMs539-U, a resin commercially available from the NOVA Chemicals Corporation. Example 3 is NOVAPOL® TR-0735-U, a resin commercially available from the NOVA Chemicals Corporation. Example 4 is ENGAGE® 8450 a resin commercially available from Dow Chemical Company. Example 5 is ENGAGE® 8200 a resin commercially available from Dow Chemical Company. Example 6 is AFFINTY® SQ 1503UE a resin commercially available from Dow Chemical Company. Example 7 is RESILITY® XUS 58441.00 a resin commercially available from Dow Chemical Company. Example 8 is NOVAPOL® TR-0338-U, a resin commercially available from the NOVA Chemicals Corporation.

The properties of compression molded plaques made from an ethylene interpolymer product (Example 1) or a comparative polyethylene rein (Examples 2-8) are provided in Table 3.

TABLE 2

| Polymer Properties | | | | | |
|---|---|---|---|---|---|
| Example No. | A1 | 1 | 2 | 3 | 4 |
| Density (g/cm$^3$) | 0.9130 | 0.9115 | 0.9385 | 0.9357 | 0.902 |
| Melt Index $I_2$ (g/10 min) | 3.8 | 4.3 | 5.1 | 7.0 | 3.0 |
| Melt Index $I_{21}$ (g/10 min) | 78 | 92 | 114 | 166 | 75 |
| Melt Flow Ratio ($I_{21}/I_2$) | 20.5 | 21.3 | 22.2 | 23.8 | 24.2 |
| Stress Exponent | 1.19 | 1.20 | | | |
| $M_n$ | 28,261 | 23,931 | 32,164 | 22,572 | 37,762 |
| $M_w$ | 73,744 | 67,837 | 68,495 | 65,172 | 66,736 |
| $M_z$ | 149,876 | 129,321 | 127,387 | 151,206 | 103,207 |
| Polydispersity Index ($M_w/M_n$) | 2.6 | 2.8 | 2.1 | 2.9 | 1.8 |
| CTREF-High Temperature Elution Peak (° C.) | — | 96.2 | 94.7 | 96.9 | 65.3 |
| CTREF-CDBI$_{50}$ | — | 68.3 | 68.6 | 36 | 89.4 |
| DSC, First melting peak, ° C. | 103.8 | 100.0 | 125.0 | 125.6 | 98.0 |
| DSC, Second melting peak, ° C. | 116.0 | 115.2 | None | None | None |
| DSC, Third melting peak, ° C. | 122.2 | 121.8 | None | None | None |
| DSC, Heat of Fusion (J/g) | 113.6 | 107.7 | 178.6 | 168.5 | 88.0 |
| DSC, Crystallinity (%) | 39.2 | 37.1 | 61.6 | 58.1 | 30 |
| GPC-FTIR Comonomer Distribution | ca. flat | ca. flat | reverse | normal | normal |
| Comonomer | 1-octene | 1-octene | 1-octene | 1-hexene | 1-octene |
| Comonomer Content (mole %) | 3.7 | 4 | 0.9 | 1.6 | |
| Comonomer Content (wt %) | 13.3 | 14.3 | 3.7 | 4.5 | |
| Capillary Melt Strength-190° C. (cN) | 1.04 | 0.93 | 0.76 | 0.58 | 1.35 |
| Capillary Melt Strength Stretch Ratio | 1436 | 1904 | 1419 | 1255 | 1317 |
| Zero-Shear Viscosity, $\eta_0$ at 190° C. (Pa · s) | 2417 | 1986 | 1677 | 1302 | 4377 |
| G'/G" at 0.05 rad/s and 190° C. | 0.015 | 0.015 | 0.009 | 0.020 | |
| Viscosity Ratio, $\eta_{0.5}/\eta_{50}$ | 1.73 | 1.70 | 1.70 | 1.68 | 1.83 |
| Internal Unsaturation/100 C. | 0.01 | 0.01 | 0.017 | 0.001 | 0.006 |
| Side Chain Unsaturation/100 C. | 0.003 | 0.004 | 0.001 | 0.003 | 0.003 |
| Terminal Unsaturation/100 C. | 0.026 | 0.029 | 0.009 | 0.015 | 0.008 |
| Hexene extractable (%) | 0.71 | 1.35 | 0.18 | 0.59 | .68 |
| Dilution Index, $Y_d$ (degrees) | 5.98 | 5.29 | 4.28 | 3.12 | −1.62 |
| Example No. | 5 | 6 | 7 | 8 | |
| Density (g/cm$^3$) | 0.8683 | 0.900 | 0.887 | 0.9384 | |
| Melt Index $I_2$ (g/10 min) | 7.0 | 6.0 | 5.0 | 3.7 | |
| Melt Index $I_{21}$ (g/10 min) | 206 | | | 88 | |
| Melt Flow Ratio ($I_{21}/I_2$) | 29.3 | | | 23.7 | |
| Stress Exponent | | | | 1.25 | |
| $M_n$ | 37,650 | | | 27,473 | |
| $M_w$ | 69,231 | | | 79,560 | |
| $M_z$ | 109,198 | | | 189,761 | |
| Polydispersity Index ($M_w/M_n$) | 1.8 | | | 2.9 | |
| CTREF-High Temperature Elution Peak (° C.) | | | | 96.6 | |
| CTREF-CDBI$_{50}$ | | | | 49.0 | |
| DSC, First melting peak, ° C. | 61.2 | 97 | 119 | 126.4 | |
| DSC, Second melting peak, ° C. | None | | | None | |
| DSC, Third melting peak, ° C. | None | | | None | |
| DSC, Heat of Fusion (J/g) | 14.8 | | | 173.9 | |
| DSC, Crystallinity (%) | | | | 60.0 | |
| GPC-FTIR Comonomer Distribution | flat | | | normal | |
| Comonomer | 1-octene | | | 1-hexene | |
| Comonomer Content (mole %) | | | | 1.2 | |
| Comonomer Content (wt %) | | | | 3.6 | |
| Capillary Melt Strength-190° C. (cN) | 0.66 | | | 0.85 | |
| Capillary Melt Strength Stretch Ratio | 625 | | | 1176 | |
| Zero-Shear Viscosity, $\eta_0$ at 190° C. (Pa · s) | 1579 | | | | |
| G'/G" at 0.05 rad/s and 190° C. | 0.009 | | | 0.024 | |
| Viscosity Ratio, $\eta_{0.5}/\eta_{50}$ | | | | 1.96 | |
| Internal Unsaturation/100 C. | | | | 0 | |
| Side Chain Unsaturation/100 C. | | | | 0 | |
| Terminal Unsaturation/100 C. | | | | 0.016 | |
| Hexene extractable (%) | | | | 0.52 | |
| Dilution Index, $Y_d$ (degrees) | | | | 1.39 | |

The data in Table 2 as well as FIGS. 1-3 show that the ethylene interpolymer products of Example A1 and Example 1 have a relatively narrow molecular weight distribution ($M_w/M_n<3.0$) and a relatively flat or uniform 1-octene comonomer incorporation. Without wishing to be bound by any single theory, the combination of a narrow molecular weight and a flat comonomer incorporation is thought to enhance powder densification by contributing favorably to the polymer rheological characteristics.

The ethylene interpolymer products of Examples A1 and 1 have three melting peaks in a DSC analysis (see Table 2 and FIG. 5). In contrast, a single melting peak is observed for each of the comparative resins, Examples 2-5 and 8 (see Table 2 and FIG. 5). For the ethylene interpolymer products of Examples A1 and 1, the three melting peaks occur at temperatures between the melting peaks of the comparative resins of Examples 2-5 and 8 (which are of higher and lower density than the ethylene interpolymer products of Examples A1 and 1) and each of the three melting peaks occurs at a temperature of 100° C. or greater. A higher melting point is typically considered to be favorable from the standpoint of resin handling.

Figure 6:
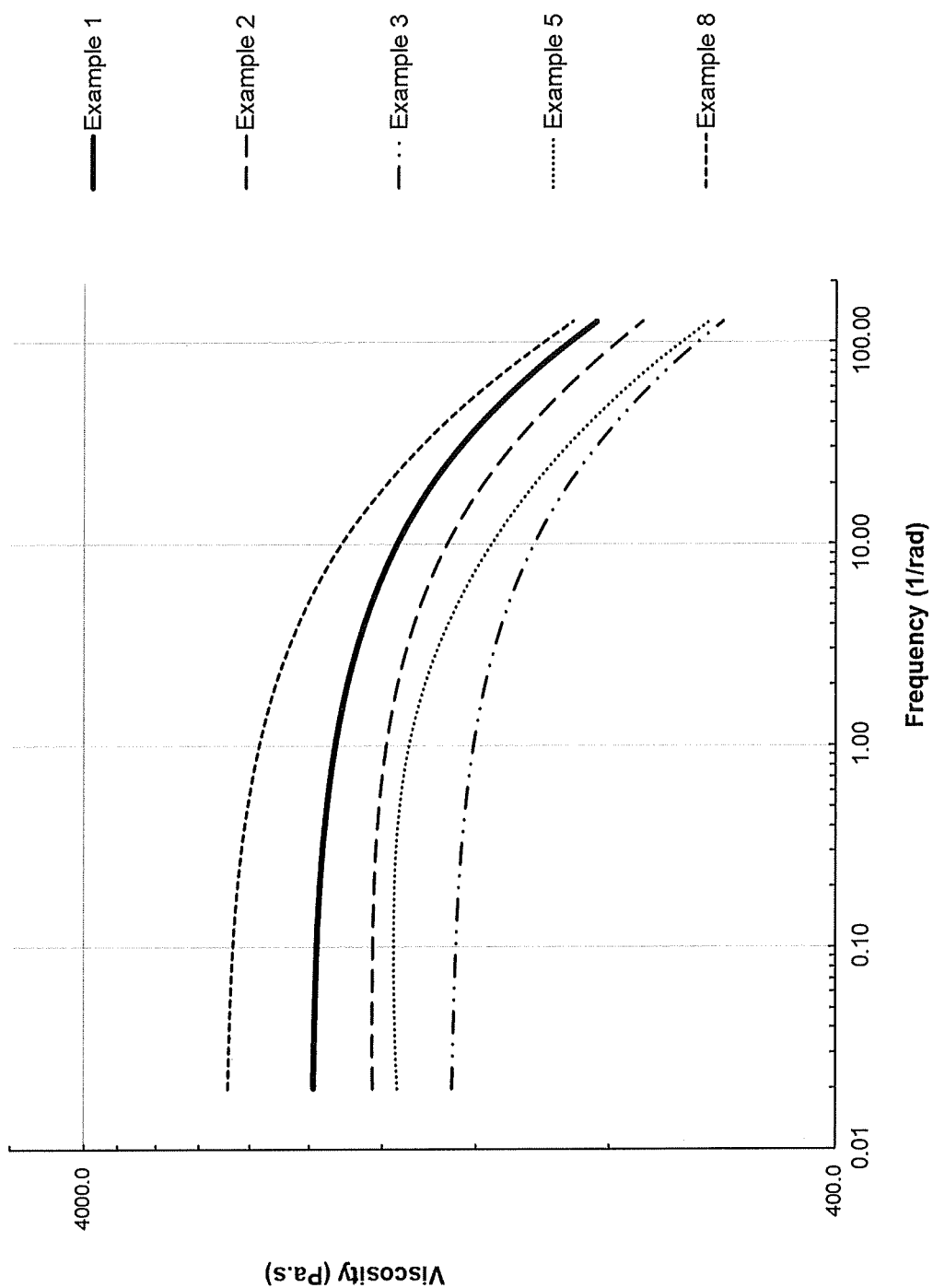
FIG. 6 shows the viscosity profiles from a DMA frequency sweep carried out at 190° C. for an ethylene interpolymer product made according to the present disclosure as well as for various comparative resins.

The Zero-Shear Viscosity, $\eta_0$ of the ethylene interpolymer product of Examples A1 and Example 1, is within the range commonly observed for polyethylene thermoplastics which find application in rotomolded parts (See Table 2), and as shown in FIG. 6, the viscosity profile of Example 1 is similar to that of higher density comparative resins, Examples 2 and 3. However, even though it has a broader molecular weight distribution ($M_w/M_n$), the Zero-Shear Viscosity, $\eta_0$ of the ethylene interpolymer of Example 1 shows a lower dependence on increasing shear and frequency in comparison to lower density comparative resin, Example 5. This feature may be a consequence of the narrower melt flow ratio (MFR), $I_{21}/I_2$ (and perhaps a relatively low viscosity ratio, Viscosity Ratio, $\eta_{0.5}/\eta_{50}$) for the ethylene interpolymer product of Example 1, relative to Example 5.

The melt strength and the melt strength stretch ratio of the ethylene interpolymer product, Example 1, were found to be relatively high when contrasted with those of comparative resins, Examples 2 and 3 (see the data in Table 2). Example 1 had a melt strength of greater than 0.8 cN, and a melt strength ratio of greater than 1500. Without wishing to be bound by any single theory, high melt strength is considered important in rotomolding applications where the molded part has a wall thickness which is small relative to the size of the part itself. In such cases, a higher melt strength helps to minimize the occurrence of secondary melt flow inside the mold cavity which can result in uneven part thickness.

The relative elasticity, defined as the ratio of G' over G" at a frequency of 0.05 rad/s, reported for both Example A1 and Example 1 in Table 2 is less than 0.50, which is consistent with a relatively low "relative elasticity". Without wishing to be bound by theory, a relatively low relative elasticity is considered favorable for powder densification during the rotational molding process.

TABLE 3

Compression Molded Plaque Properties

| Example No. | 1 | 2 | 3 | 4 |
|---|---|---|---|---|
| Density (g/cm³) | 0.9115 | 0.9385 | 0.9357 | 0.902 |
| Melt Index I₂ (g/10 min) | 4.3 | 5.1 | 7.0 | 3.0 |

TABLE 3-continued

Compression Molded Plaque Properties

| Tensile Properties | | | | |
|---|---|---|---|---|
| Elong. at Yield (%) | 18 | 12 | 11 | |
| Elong. at Yield Dev. (%) | 1 | 1 | 1 | |
| Yield Strength (MPa) | 8.9 | 20.3 | 17.9 | |
| Yield Strength Dev. (MPa) | 0.1 | 0.2 | 0.2 | |
| Ultimate Elong. (%) | 774 | 984 | 653 | 750 |
| Ultimate Elong. Dev. (%) | 6.5 | 35 | 42 | |
| Ultimate Strength (MPa) | 32.5 | 31.3 | 15.7 | 22.4 |
| Ultimate Strength Dev. (MPa) | 0.7 | 1.1 | 1.4 | |
| Sec Mod 1% (MPa) | 217 | 965 | | |
| Sec Mod 1% (MPa) Dev. | 4.4 | 78 | | |
| Flexural Properties | | | | |
| Flex Secant Mod. 1% (MPa) | 212 | 817 | 755 | 76.3 |
| Flex Sec Mod 1% (MPa) Dev. | 9 | 18 | 28 | |
| Flex Secant Mod. 2% (MPa) | 189 | 698 | 641 | 75.6 |
| Flex Sec Mod 2% (MPa) Dev. | 6 | 26 | 22 | |
| Softening Temperature | | | | |
| VICAT (° C.) | 93.7 | | 113.0 | 84 |
| Hardness | | | | |
| Hardness Shore D | 54.0 | 122.9 | 60.0 | 41 |

| Example No. | 5 | 6 | 7 | 8 |
|---|---|---|---|---|
| Density (g/cm³) | 0.8683 | 0.900 | 0.887 | 0.9384 |
| Melt Index I₂ (g/10 min) | 7.0 | 6.0 | 5.0 | 3.7 |
| Tensile Properties | | | | |
| Elong. at Yield (%) | | | | 12 |
| Elong. at Yield Dev. (%) | | | | 1 |
| Yield Strength (MPa) | | 5 | | 19.1 |
| Yield Strength Dev. (MPa) | | | | 0.2 |
| Ultimate Elong. (%) | 1100 | 1200 | | 636 |
| Ultimate Elong. Dev. (%) | | | | 22 |
| Ultimate Strength (MPa) | 5.7 | 21 | | 16.3 |
| Ultimate Strength Dev. (MPa) | | | | 0.9 |
| Sec Mod 1% (MPa) | | | | 979 |
| Sec Mod 1% (MPa) Dev. | | | | 149 |
| Flexural Properties | | | | |
| Flex Secant Mod. 1% (MPa) | 10.9 | | 46.9 | 783 |
| Flex Sec Mod 1% (MPa) Dev. | | | | 27 |
| Flex Secant Mod. 2% (MPa) | 10.8 | 81 | | |
| Flex Sec Mod 2% (MPa) Dev. | | | | |
| Softening Temperature | | | | |
| VICAT (° C.) | 43.3 | 82 | | |
| Hardness | | | | |
| Hardness Shore D | 17 | 40 | 30.2 | |

As can be seen from the data provided in Table 3, an ethylene interpolymer product of the present disclosure (Example 1) has properties which are useful for flexible applications such as for example the manufacture of flexible or "soft touch" or "soft touch feel" rotomolded articles.

When made into a compression molded plaque, Example 1 had lower flexural modulus, lower tensile modulus, higher tensile elongation at yield and a higher ultimate tensile strength, when compared to plaques made from comparative Examples 2, 3 and 8, medium density polyethylene resins which have found application in rotomolding articles. The much lower flexural secant modulus (212 MPa at 1%; and 189 MPa at 2%) and tensile secant modulus (217 MPa at 1%) of Example 1 was particularly noteworthy, and compared more favourably to commercially available elastomeric and plastomeric resins, Comparative Examples 4-7.

Without wishing to be bound by theory, the a low tensile and flexural modulus combined with a high tensile elongation at yield is desirable for the formation of a rotomolded part which is flexible enough to deform under stress, but also resilient enough to return to its original shape without suffering from permanent deformation.

The softening temperature (VICAT) for the ethylene interpolymer product of Example 1 was below 100° C. and fell between the values obtained for higher density rotomolding grades (Comparative Examples 2 and 3) and lower density elastomeric and plastomeric grades (Comparative Examples 4-6). Without wishing to be bound by any single theory, a higher softening temperature is desirable from the standpoint of rein handling, but a lower softening temperature is indicative of improved haptic properties which are beneficial for the manufacture of "soft touch" or "soft touch feel" articles and end uses.

The Shore D hardness score of 54.0 for the ethylene interpolymer product of Example 1, also fell between the values obtained for the comparative medium density (Examples 2 and 3) and low density (Examples 4-7) polyethylene resins.

Ethylene Interpolymer Product Compounding

A UV (ultra violet) light protective additive was compounded into the ethylene interpolymer product using a twin screw compounding line. Ethylene interpolymer product (97.7 wt %) was tumble blended with an ethylene interpolymer masterbatch (2.3 wt %) containing Tinuvin 622 (a UV-light stabilizer available from BASF Corporation, Florham Park, N.J., U.S.A); this salt and pepper dry blend was melt mixed using a Coperion ZSK26MC intermeshing co-rotating twin screw extruder with a screw diameter of 26 mm and a length (L) to diameter (D) ratio of 32/1 (L/D). The extruder was operated at about 200° C. at a screw speed of about 200 rpm and pelletized at a rate of about 20 kg/hr. The compounded ethylene interpolymer product contain about 1500 ppm of UV-stabilizer. Prior to rotomolding, the compounded resin was passed through a grinder such that a powder of ethylene interpolymer product was produced having 35 US mesh size (mesh opening of 0.0197 inch (500 μm)).

Rotomolded Part Preparation

The powdered ethylene interpolymer products of this disclosure are converted into rotomolded parts employing a rotational molding machine; specifically, a Rotospeed RS3-160 available from Ferry Industries Inc. (Stow, Ohio, USA). The Rotospeed has two arms which rotate about a central axis within an enclosed oven. The arms are fitted with plates which rotate on an axis that is roughly perpendicular to the axis of rotation of the arm. Each arm is fitted with six cast aluminum molds that produce a hollow rotomolded part of cubical shape, i.e.: 12.5 inches (31.8 cm)×12.5 inches×12.5 inches. The arm rotation was set to about 8 revolutions per minute (rpm) and the plate rotation was set to about 2 rpm. Rotomolded parts having a nominal thickness of about 0.125 inches (0.32 cm) were produced employing a standard charge of about 1.85 kg of polyethylene resin in powder form; where the powder has a 35 US mesh size (mesh opening of 0.0197 inch (500 μm)). The temperature within the enclosed oven was maintained at a temperature of 560° F. (293° C.). The molds and their contents were heated in the oven for 10, 12 or 14 minutes to ensure that full powder densification was achieved. The molds were subsequently cooled using air fans for about 30 minutes prior to removing the part from the mold. Specimens were collected from the molded parts for density, and ARM Impact testing and the results are reported in Table 4.

ARM Impact Testing

The ARM impact test was performed in accordance with ASTM D5628, herein incorporated by reference, at a test temperature of −40° C. This test was adapted from the Association of Rotational Molders International, Low Temperature Impact Test, Version 4.0 dated July 2003; herein incorporated by reference. The purpose of this test was to determine the impact properties of a rotomolded part. ARM Impact test specimens, 5 inch×5 inch (12.7 cm×12.7 cm) were cut from a side wall of the cubical rotomolded part. Test specimens were thermally equilibrated in a refrigerated testing laboratory maintained at −40° F.±3.5° F. (−40° C.±2° C.) for at least 24 hours prior to impact testing. The testing technique employed is commonly called the Bruceton Staircase Method or the Up-and-Down Method. The procedure establishes the height of a specific dart that will cause 50% of the specimens to fail, i.e. testing (dart falling on specimens) was carried out until there was a minimum of 10 passes and 10 fails. Each failure was characterized as a ductile or a brittle failure. Ductile failure was characterized by penetration of the dart though the specimen and the impact area was elongated and thinned leaving a hole with stringy fibers at the point of failure. Brittle failure was evident when the test specimen cracked, where the cracks radiated outwardly from point of failure and the sample showed very little to no elongation at the point of failure. The "ARM Ductility %" was calculated as follows: 100× [(number of ductile failures)/(total number of all failures)].

Samples were impact tested using a drop weight impact tester; impact darts available consisted of 10 lb (4.54 kg), 15 lb (6.80 kg), 20 lb (9.07 kg) or 30 lb (13.6 kg) darts. All impact darts had a rounded dart tip having a diameter of 1.0±0.005 inch (2.54 cm), the dart tip transitioned into a lower cylindrical shaft (1.0 inch diameter), the length of the lower cylindrical shaft (to dart tip) was 4.5 inch (11.4 cm). Impact dart included an upper cylindrical shaft having a diameter of 2.0 inch (5.08 cm), the length of the upper cylinder shaft varied depending on the desired weight of the dart, e.g. 10.5 inch (26.7 cm) or 16.5 inch (41.9 cm) for the 10 lb or 20 lb dart, respectively. Preferably a dart weight is selected such that the drop height is between 2.5 ft and 7.5 ft (0.8 m to 2.3 m). Test specimens were oriented in the impact tester such that the falling dart impacted the surface of the part that was in contact with the mold (when molded). If the sample did not fail at a given height and weight, either the height or weight was increased incrementally until part failure occurred. Once failure occurred, the height or weight is decreased by the same increment and the process is repeated. The "ARM Mean Failure Energy (ft·lbs)" was calculated by multiplying the drop height (ft) by the nominal dart weight (lbs). After impact, both the upper and lower surface of the specimen were inspected for failure. For the ethylene interpolymer products disclosed herein, a ductile failure was desired failure mode.

TABLE 4

| ARM Impact Properties of Rotomolded Parts (0.125 inches thickness) | | | | | | | | | |
|---|---|---|---|---|---|---|---|---|---|
| Example No. | 1 | | | 2 | | | 3 | | |
| Oven Residence Time | 10 | 12 | 14 | 10 | 12 | 14 | 10 | 12 | 14 |
| ARM Impact at −40° C., ARM Mean Failure Energy (ft. lb) | 47.8 | 39.4 | 43.3 | 27.7 | 40.7 | 48.8 | 29.7 | 25.8 | 46.8 |
| Ductility (%) | 100 | 100 | 100 | 55 | 100 | 100 | 56 | 67 | 82 |
| Peak Internal Air Temperature (° C.) | 160.6 | 184.4 | 206.7 | 171.7 | 200.0 | 217.8 | 179.4 | 206.7 | 221.7 |
| Density (g/cm$^3$) | 0.8963 | 0.8987 | 0.9085 | 0.9329 | 0.9402 | 0.9406 | 0.9246 | 0.9353 | 0.9369 |

The data in Table 4 show that the ethylene interpolymer product of Example 1 has good ARM impact performance properties with a high mean failure energy (of from 39.4 to 47.8 ft·lb) and a high ductility failure rate (with 100% of the failures occurring being ductile failures rather than brittle failures). In contrast, comparative Examples 2 and 3 showed an increased propensity for brittle failures and had a lower average mean failure energy when considered over the three different oven residence times (10 min, 12 min and 14 min).

In addition, the ethylene interpolymer of Example 1 could be rotomolded at a lower peak internal air temperature relative to comparative Examples 2 and 3. This is consistent with the lower melting point temperatures observed for the ethylene interpolymer product of Example 1 in the differential scanning colorimetry analysis relative to Examples 2 and 3 (see the data in Tables 2 and 4). This may afford some advantages with respect to energy utilization when rotomolding a part using the ethylene interpolymer products described in the present disclosure.

Non-limiting embodiments of the present disclosure include the following:

Embodiment A. A rotomolded article prepared from an ethylene interpolymer product having a melt index, $I_2$ of from 2.5 to 8.0 g/10 min, and a density of from 0.905 to 0.920 g/cm$^3$; wherein said ethylene interpolymer product includes:

(I) a first ethylene interpolymer;
(II) a second ethylene interpolymer, and;
(III) optionally a third ethylene interpolymer;

wherein said first ethylene interpolymer is produced using a single site catalyst formulation including a component (i) defined by the formula $$(L^A)_a M(Pl)_b (Q)_n$$

wherein $L^A$ is chosen from unsubstituted cyclopentadienyl, substituted cyclopentadienyl, unsubstituted indenyl, substituted indenyl, unsubstituted fluorenyl and substituted fluorenyl; M is a metal chosen from titanium, hafnium and zirconium; Pl is a phosphinimine ligand; and Q is independently chosen from a hydrogen atom, a halogen atom, a $C_{1-10}$ hydrocarbyl radical, a $C_{1-10}$ alkoxy radical and a $C_{5-10}$ aryl oxide radical; wherein each of said hydrocarbyl, alkoxy, and aryl oxide radicals may be unsubstituted or further substituted by a halogen atom, a $C_{1-18}$ alkyl radical, a $C_{1-8}$ alkoxy radical, a $C_{6-10}$ aryl or aryloxy radical, an amido radical which is unsubstituted or substituted by up to two $C_{1-8}$ alkyl radicals or a phosphido radical which is unsubstituted or substituted by up to two $C_{1-8}$ alkyl radicals; wherein a is 1; b is 1; n is 1 or 2; and (a+b+n) is equivalent to the valence of the metal M, and;

wherein said second ethylene interpolymer is produced using a first Ziegler-Natta catalyst formulation;

wherein said third ethylene interpolymer when present, is produced using said first Ziegler-Natta catalyst formulation or a second Ziegler-Natta catalyst formulation, and;

wherein said ethylene interpolymer product has a Dilution Index, Yd, greater than 0.

Embodiment B. The rotomolded article according to Embodiment A wherein the ethylene interpolymer product has a density of from 0.905 to 0.914 g/cm$^3$.

Embodiment C. The rotomolded article according to Embodiment A or B wherein the ethylene interpolymer product has a density of from 0.910 to 0.912 g/cm$^3$.

Embodiment D. The rotomolded article according to Embodiment A, B or C wherein the ethylene interpolymer product has a melt index, $I_2$ of from 2.5 to 6.0 g/10 min.

Embodiment E. The rotomolded article according to Embodiment A, B, C, or D wherein the ethylene interpolymer product has a melt index, $I_2$ of from 2.5 to 4.5 g/10 min.

Embodiment F. The rotomolded article according to claim Embodiment A, B, C, D or E wherein the ethylene interpolymer product has a molecular weight distribution, $M_w/M_n$ of less than 4.0.

Embodiment G. The rotomolded article according to Embodiment A, B, C, D, E, or F wherein the ethylene interpolymer product has a composition distribution breadth index, $CDBI_{50}$ of at least 65%.

Embodiment H. The rotomolded article according to Embodiment A, B, C, D, E, F, or G wherein the ethylene interpolymer product has three melting peaks in a differential scanning calorimetry (DSC) analysis.

Embodiment I. The rotomolded article according to H wherein each of the melting peaks have a minimum at a temperature of 100° C. or greater.

Embodiment J. The rotomolded article according to Embodiment A, B, C, D, E, F, G, H, or I wherein the ethylene interpolymer product has a Dilution Index, Yd, of from 4.5 to 6.5.

Embodiment K. The rotomolded article according to Embodiment A, B, C, D, E, F, G, H, I, or J wherein the ethylene interpolymer product is made using a solution polymerization process.

Embodiment L. The rotomolded article according to Embodiment A, B, C, D, E, F, G, H, I, J, or K wherein the ethylene interpolymer product includes ethylene and 1-octene.

Embodiment M. The rotomolded article according to Embodiment A, B, C, D, E, F, G, H, I, J, K, or L wherein the ethylene interpolymer product has a flexural secant modulus at 1%, of less than 300 MPa.

Embodiment N. The rotomolded article according to Embodiment A, B, C, D, E, F, G, H, I, J, K, L or M wherein the ethylene interpolymer product has a tensile secant modulus at 1%, of less than 300 MPa.

Embodiment O. The rotomolded article according to Embodiment A, B, C, D, E, F, G, H, I, J, K, L, M, or N wherein the ethylene interpolymer product has a tensile elongation at yield of greater than 14%.

Embodiment P. The rotomolded article according to Embodiment A, B, C, D, E, F, G, H, I, J, K, L, M, N, or O wherein the ethylene interpolymer product has a VIACAT softening temperature of below 100° C.

Embodiment Q. The rotomolded article according to Embodiment A, B, C, D, E, F, G, H, I, J, K, L, M, N, O, or P wherein the ethylene interpolymer product has a Shore D hardness score of less than 60.

Embodiment R. The rotomolded article according to Embodiment A, B, C, D, E, F, G, H, I, J, K, L, M, N, O, P, or Q wherein the ethylene interpolymer product has a zero shear viscosity, $\eta_0$ at 190° C. of from 1000 to 5000 Pa·s.

Embodiment 5. The rotomolded article according to Embodiment A, B, C, D, E, F, G, H, I, J, K, L, M, N, O, P, Q, or R wherein the ethylene interpolymer product has a relative elasticity, defined as the ratio of G' over G" at a frequency of 0.05 rad/s, of less than 0.50.

Embodiment T. The rotomolded article according to Embodiment A, B, C, D, E, F, G, H, I, J, K, L, M, N, O, P, Q, R, or S wherein the ethylene interpolymer product has a melt strength of at least 0.8 cN.

Embodiment U. The rotomolded article according to Embodiment A, B, C, D, E, F, G, H, I, J, K, L, M, N, O, P, Q, R, S, or T wherein the ethylene interpolymer product has a melt strength stretch ratio of greater than 1400.

Embodiment V. The rotomolded article according to Embodiment A, B, C, D, E, F, G, H, I, J, K, L, M, N, O, P, Q, R, S, T or U wherein the ethylene interpolymer product has 0.024 terminal vinyl unsaturations per 100 carbon atoms.

Embodiment W. A process for forming a rotomolded article, the process including:

(a) preparing an ethylene interpolymer product having a melt index, $I_2$ of from 2.5 to 8.0 g/10 min, and a density of from 0.905 to 0.920 g/cm³; wherein said ethylene interpolymer product includes:

(I) a first ethylene interpolymer;
(II) a second ethylene interpolymer, and;
(III) optionally a third ethylene interpolymer;

wherein said first ethylene interpolymer is produced using a single site catalyst formulation including a component (i) defined by the formula $(L^A)_a M(Pl)_b (Q)_n$ wherein $L^A$ is chosen from unsubstituted cyclopentadienyl, substituted cyclopentadienyl, unsubstituted indenyl, substituted indenyl, unsubstituted fluorenyl and substituted fluorenyl; M is a metal chosen from titanium, hafnium and zirconium; Pl is a phosphinimine ligand; and Q is independently chosen from a hydrogen atom, a halogen atom, a $C_{1-10}$ hydrocarbyl radical, a $C_{1-10}$ alkoxy radical and a $C_{5-10}$ aryl oxide radical; wherein each of said hydrocarbyl, alkoxy, and aryl oxide radicals may be unsubstituted or further substituted by a halogen atom, a $C_{1-18}$ alkyl radical, a $C_{1-8}$ alkoxy radical, a $C_{6-10}$ aryl or aryloxy radical, an amido radical which is unsubstituted or substituted by up to two $C_{1-8}$ alkyl radicals or a phosphido radical which is unsubstituted or substituted by up to two $C_{1-8}$ alkyl radicals; wherein a is 1; b is 1; n is 1 or 2; and (a+b+n) is equivalent to the valence of the metal M, and;

wherein said second ethylene interpolymer is produced using a first Ziegler-Natta catalyst formulation;

wherein said third ethylene interpolymer, when present, is produced using said first Ziegler-Natta catalyst formulation or a second Ziegler-Natta catalyst formulation, and;

wherein said ethylene interpolymer product has a Dilution Index, Yd, greater than 0; and (b) rotomolding the ethylene interpolymer product to form a rotomolded article.

Embodiment X. The process of Embodiment W wherein the ethylene interpolymer product has a density of from 0.905 to 0.914 g/cm³.

Embodiment Y. A rotomolded article prepared from an ethylene interpolymer product having a melt index, $I_2$ of from 2.5 to 8.0 g/10 min, and a density of from 0.905 to 0.920 g/cm³; wherein said ethylene interpolymer product includes:

(I) a first ethylene interpolymer;
(II) a second ethylene interpolymer, and;
(III) optionally a third ethylene interpolymer;

wherein said ethylene interpolymer product has a Dilution Index, Yd, of from 4.5 to 6.0.

Embodiment Z. The rotomolded article of Embodiment Y wherein the ethylene interpolymer product has a density of from 0.905 to 0.914 g/cm³.

Embodiment AA. The rotomolded article of Embodiment Y wherein the ethylene interpolymer product has a density of from 0.910 to 0.912 g/cm³.

We claim:

1. A rotomolded article prepared from an ethylene interpolymer product having a melt index, $I_2$ of from 2.5 to 8.0 g/10 min, and a density of from 0.905 to 0.920 g/cm³; wherein said ethylene interpolymer product comprises:

(I) a first ethylene interpolymer;
(II) a second ethylene interpolymer, and;
(III) optionally a third ethylene interpolymer;

wherein said first ethylene interpolymer is produced using a single site catalyst formulation comprising a component (i) defined by the formula $(L^A)_a M(Pl)_b (Q)_n$ wherein $L^A$ is chosen from unsubstituted cyclopentadienyl, substituted cyclopentadienyl, unsubstituted indenyl, substituted indenyl, unsubstituted fluorenyl and substituted fluorenyl; M is a metal chosen from titanium, hafnium and zirconium; Pl is a phosphinimine ligand; and Q is independently chosen from a hydrogen atom, a halogen atom, a $C_{1-10}$ hydrocarbyl radical, a $C_{1-10}$ alkoxy radical and a $C_{5-10}$ aryl oxide radical; wherein each of said hydrocarbyl, alkoxy, and aryl oxide radicals may be unsubstituted or further substituted by a halogen atom, a $C_{1-18}$ alkyl radical, a $C_{1-8}$ alkoxy radical, a $C_{6-10}$ aryl or aryloxy radical, an amido radical which is unsubstituted or substituted by up to two $C_{1-8}$ alkyl radicals or a phosphido radical which is unsubstituted or substituted by up to two $C_{1-8}$ alkyl radicals; wherein a is 1; b is 1; n is 1 or 2; and (a+b+n) is equivalent to the valence of the metal M, and;

wherein said second ethylene interpolymer is produced using a first Ziegler-Natta catalyst formulation;

wherein said third ethylene interpolymer, when present, is produced using said first Ziegler-Natta catalyst formulation or a second Ziegler-Natta catalyst formulation, and;

wherein said ethylene interpolymer product has a Dilution Index, Yd, greater than 0, and a flexural secant modulus at 1%, of less than 300 MPa.

2. The rotomolded article according to claim 1 wherein the ethylene interpolymer product has a density of from 0.905 to 0.914 g/cm$^3$.

3. The rotomolded article according to claim 1 wherein the ethylene interpolymer product has a density of from 0.910 to 0.912 g/cm$^3$.

4. The rotomolded article according to claim 1 wherein the ethylene interpolymer product has a melt index, 12 of from 2.5 to 6.0 g/10 min.

5. The rotomolded article according to claim 1 wherein the ethylene interpolymer product has a melt index, 12 of from 2.5 to 4.5 g/10 min.

6. The rotomolded article according to claim 1 wherein the ethylene interpolymer product has a molecular weight distribution, $M_w/M_n$ of less than 4.0.

7. The rotomolded article according to claim 1 wherein the ethylene interpolymer product has a composition distribution breadth index, $CDBI_{50}$ of at least 65%.

8. The rotomolded article according to claim 1 wherein the ethylene interpolymer product has three melting peaks in a differential scanning calorimetry (DSC) analysis.

9. The rotomolded article according to claim 8 wherein each of the melting peaks has a minimum at a temperature of 100° C. or greater.

10. The rotomolded article according to claim 1 wherein the ethylene interpolymer product has a Dilution Index, Yd, of from 4.5 to 6.5.

11. The rotomolded article according to claim 1 wherein the ethylene interpolymer product is made using a solution polymerization process.

12. The rotomolded article according to claim 1 wherein the ethylene interpolymer product comprises ethylene and 1-octene.

13. The rotomolded article according to claim 1 wherein the ethylene interpolymer product has a tensile secant modulus at 1%, of less than 300 MPa.

14. The rotomolded article according to claim 1 wherein the ethylene interpolymer product has a tensile elongation at yield of greater than 14%.

15. The rotomolded article according to claim 1 wherein the ethylene interpolymer product has a VICAT softening temperature of below 100° C.

16. The rotomolded article according to claim 1 wherein the ethylene interpolymer product has a Shore D hardness score of less than 60.

17. The rotomolded article according to claim 1 wherein the ethylene interpolymer product has a zero shear viscosity, $\eta_0$ at 190° C. of from 1000 to 5000 Pa·s.

18. The rotomolded article according to claim 1 wherein the ethylene interpolymer product has a relative elasticity, defined as the ratio of G' over G" at a frequency of 0.05 rad/s, of less than 0.50.

19. The rotomolded article according to claim 1 wherein the ethylene interpolymer product has a melt strength of at least 0.8 cN.

20. The rotomolded article according to claim 1 wherein the ethylene interpolymer product has a melt strength stretch ratio of greater than 1400.

21. The rotomolded article according to claim 1 wherein the ethylene interpolymer product has ≥0.024 terminal vinyl unsaturations per 100 carbon atoms.

22. A process for forming a rotomolded article, the process comprising:
(a) preparing an ethylene interpolymer product having a melt index, $I_2$ of from 2.5 to 8.0 g/10 min, and a density of from 0.905 to 0.920 g/cm$^3$; wherein said ethylene interpolymer product comprises:
(I) a first ethylene interpolymer;
(II) a second ethylene interpolymer, and;
(III) optionally a third ethylene interpolymer;
wherein said first ethylene interpolymer is produced using a single site catalyst formulation comprising a component (i) defined by the formula $$(L^A)_a M(Pl)_b (Q)_n$$

wherein $L^A$ is chosen from unsubstituted cyclopentadienyl, substituted cyclopentadienyl, unsubstituted indenyl, substituted indenyl, unsubstituted fluorenyl and substituted fluorenyl; M is a metal chosen from titanium, hafnium and zirconium; Pl is a phosphinimine ligand; and Q is independently chosen from a hydrogen atom, a halogen atom, a $C_{1-10}$ hydrocarbyl radical, a $C_{1-10}$ alkoxy radical and a $C_{5-10}$ aryl oxide radical; wherein each of said hydrocarbyl, alkoxy, and aryl oxide radicals may be unsubstituted or further substituted by a halogen atom, a $C_{1-18}$ alkyl radical, a $C_{1-8}$ alkoxy radical, a $C_{6-10}$ aryl or aryloxy radical, an amido radical which is unsubstituted or substituted by up to two $C_{1-8}$ alkyl radicals or a phosphido radical which is unsubstituted or substituted by up to two $C_{1-8}$ alkyl radicals; wherein a is 1; b is 1; n is 1 or 2; and (a+b+n) is equivalent to the valence of the metal M, and;

wherein said second ethylene interpolymer is produced using a first Ziegler-Natta catalyst formulation;

wherein said third ethylene interpolymer, when present, is produced using said first Ziegler-Natta catalyst formulation or a second Ziegler-Natta catalyst formulation, and;

wherein said ethylene interpolymer product has a Dilution Index, Yd, greater than 0, and a flexural secant modulus at 1%, of less than 300 MPa; and (b) rotomolding the ethylene interpolymer product to form a rotomolded article.

23. The process of claim 22 wherein the ethylene interpolymer product has a density of from 0.905 to 0.914 g/cm$^3$.

24. A rotomolded article prepared from an ethylene interpolymer product having a melt index, 12 of from 2.5 to 8.0 g/10 min, and a density of from 0.905 to 0.920 g/cm$^3$; wherein said ethylene interpolymer product comprises:
(I) a first ethylene interpolymer;
(II) a second ethylene interpolymer, and;
(III) optionally a third ethylene interpolymer;
wherein said ethylene interpolymer product has a Dilution Index, Yd, of from 4.5 to 6.5, and a flexural secant modulus at 1%, of less than 300 MPa.

25. The rotomolded article of claim 24 wherein the ethylene interpolymer product has a density of from 0.905 to 0.914 g/cm$^3$.

26. The rotomolded article of claim 24 wherein the ethylene interpolymer product has a density of from 0.910 to 0.912 g/cm$^3$.

* * * * *